(12) United States Patent
Hamano

(10) Patent No.: US 7,099,053 B2
(45) Date of Patent: Aug. 29, 2006

(54) MOUNT CARRIER UNIT AND FILM SCANNER

(75) Inventor: Yasuhiro Hamano, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 930 days.

(21) Appl. No.: 10/120,360

(22) Filed: Apr. 12, 2002

(65) Prior Publication Data

US 2002/0176123 A1 Nov. 28, 2002

(30) Foreign Application Priority Data

Apr. 17, 2001 (JP) .............................. 2001-118604

(51) Int. Cl.
*H04N 1/04* (2006.01)
(52) U.S. Cl. ..................... 358/474; 358/498; 358/487; 358/496; 399/378; 399/369
(58) Field of Classification Search ................ 358/474, 358/498, 487, 496, 497; 399/378, 369
See application file for complete search history.

(56) References Cited

U.S. PATENT DOCUMENTS

| | | | | |
|---|---|---|---|---|
| 4,602,865 A | * | 7/1986 | Yamaguchi et al. | 355/40 |
| 4,831,461 A | * | 5/1989 | Ohta et al. | 358/296 |
| 5,589,953 A | * | 12/1996 | Tazawa et al. | 358/498 |
| 5,726,773 A | * | 3/1998 | Mehlo et al. | 358/474 |
| 5,855,106 A | * | 1/1999 | Koyama et al. | 53/556 |
| 6,278,510 B1 | * | 8/2001 | Stoebe et al. | 355/27 |

FOREIGN PATENT DOCUMENTS

| | | |
|---|---|---|
| EP | 1 176 797 A | 1/2002 |
| JP | 11-112714 A | 4/1999 |
| JP | 2002-40573 A | 2/2002 |
| JP | 2002-40574 A | 2/2002 |
| JP | 2002-40577 A | 2/2002 |
| JP | 2002-90917 A | 3/2002 |
| JP | 2002-90974 A | 3/2002 |
| JP | 2002-90974 T1 | 3/2002 |
| JP | 2002-107839 A | 4/2002 |
| JP | 2002-206951 A | 7/2002 |
| JP | 2002-207257 A | 7/2002 |
| JP | 2002-281239 A | 9/2002 |

* cited by examiner

*Primary Examiner*—Douglas Q. Tran
*Assistant Examiner*—Negussie Worku
(74) *Attorney, Agent, or Firm*—Smith Patent Office

(57) ABSTRACT

Based on the difference in shape between a mount and a dummy mount subjected to scanning, an output signal having a pattern which differs depending on whether the mount or the dummy mount is transported is outputted from a photo coupler 54 along with driving of a mount pusher pawl 23. Further, a detection signal indicative of whether the mount or the dummy mount is transported or neither the mount nor the dummy mount is transported following the driving of the mount pusher pawl 23 is outputted from a photo coupler 59. With the use of these two output signals, whether the mount is transported or not, whether the dummy mount is transported or not or whether neither the mount nor the mount is transported or not can be detected by the driving of the mount pusher pawl with high accuracy.

12 Claims, 17 Drawing Sheets

MOUNT CARRIER UNIT AND FILM SCANNER

TECHNICAL FIELD OF THE INVENTION

The present invention relates to a mount carrier unit for transporting a mount which holds a film and a film scanner for scanning the film held by the mount.

BACKGROUND OF THE INVENTION

There has been known a photographic processing device which is capable of automatically performing processings such as exposure, development, bleaching and fixing, stabilizing and the like with respect to a photosensitive material such as a photographic printing paper. In exposing the photosensitive material using such a photographic processing device, a direct (analogue) exposure which exposes the photosensitive material by making use of a transmitting light of a photographic film has been widely performed. On the other hand, recently, a so-called digital exposure which exposes the photosensitive material using light which is controlled in response to digital image signals obtained by picking up pictures of a film using a film scanner having a pick-up element such as a CCD has been commercialized. By adopting the digital exposure method, various image processings such as the color correction, the concentration correction, sharpening processing and the like can be performed with high degree of freedom and, at the same time, the rapid additional printing can be performed. Further, it is possible to obtain favorable prints of high quality which exhibits the excellent reproducibility of color and concentration and the excellent resolution.

There may be a case that for accurately and efficiently reading images recorded in a film (usually, a positive film) for one frame held by a mount (usually, mount) made of paper or plastic, a mount carrier unit which transports the mount to a film scanning position is mounted on the film scanner.

One example of such a mount carrier unit is described in Japanese Patent Laid-open No. 112714/1999. The mount carrier unit described in this publication includes mount accommodating boxes (stockers) at both sides of a carrier body. Then, with respect to this mount carrier unit, mounts which are accommodated in one mount accommodating box are fed to the carrier body and the mounts are transferred to and are accommodated in the other mount accommodating box by way of a scanning position together with the carrier body in a state that the mount is clamped by a pair of rollers in the inside of the carrier body.

In scanning the mounts corresponding to a plurality of orders at a time using a film scanner on which the above-mentioned mount carrier unit is mounted, these mounts may be accommodated in the mount accommodating box in such a manner that the mounts for a plurality of orders are arranged to form one stack. However, according to the technique disclosed in the above-mentioned publication, it is difficult to determine a boundary between orders and hence, when the mounts corresponding to a plurality of orders are accommodated in the mount accommodating box such that the mounts are arranged as a unit, it is impossible to prepare an index print for each order or to sort the prints for each order.

Accordingly, when it is necessary to prepare the index prints for each order, a plurality of mount accommodating boxes each of which accommodate the mounts for one order are mounted on the scanner sequentially by replacing the box each time the mounts are discharged from the mount accommodating box, or alternatively, after the mounts for one order in the mount accommodating box are discharged, the mounts for next one order are accommodated in the box. Such an exchanging operation and mount additional accommodating operation are not so cumbersome when the number of mounts for one order is relatively large. However, when the number of mounts for one order is small, there arises a case in which a very small number of mounts are accommodated in the mount accommodating box compared to the allowable number of mounts which can be accommodated in the mount accommodating box thus leading to the ineffective use of the mount accommodating box. In this case, it is necessary to perform the above-mentioned operation frequently and this makes the operation extremely cumbersome so that a considerable time is required to complete the scanning. Further, even when the prints or the like are subjected to the automatic processing including the scanning of the mounts, since the scanning for one order is completed instantly so that there arises a disadvantage that an operator has to perform the above-mentioned operation while always standing beside the scanner.

Accordingly, it is an object of the present invention to provide a mount carrier unit which is suitable for rapidly scanning mounts corresponding to a plurality of orders without performing a cumbersome operation.

Further, it is another object of the present invention to provide a film scanner which is capable of rapidly scanning the mounts corresponding to a plurality of orders without performing a cumbersome operation.

SUMMARY OF INVENTION

A mount carrier unit according to the present invention includes a transport means which sequentially transports mounts which hold films or dummy mounts which have a feature different from a feature of the mounts one after another in the order in accordance with the relative position between the mounts and the dummy mounts in the inside of a mount accommodating box in which the mounts and the dummy mounts are accommodated in a stacked manner, and a first sensor which is capable of outputting detection results having patterns different from each other corresponding to a case in which the mount is transported by the transport means and a case in which the dummy mount is transported by the transport means based on features of the mount and the dummy mount along with the driving of the transport means.

Further, according to another aspect of the present invention, a film scanner includes a scanning means for scanning images recorded in films held by mounts, a transport means which sequentially transports mounts or dummy mounts which have a feature in appearance different from a feature in appearance of the mounts one after another in the order in accordance with the relative position between the mounts and the dummy mounts in the inside of a mount accommodating box in which the mounts and the dummy mounts are accommodated in a stacked manner for making the mounts and the dummy mounts subjected to scanning by the scanning means, and a determination means for determining whether the mount or the dummy mount is transported by the transport means based on the change of image signals obtained by the scanning means following the driving of the transport means.

The mount carrier unit of the present invention can distinguish between the dummy mount and the mount using the first sensor. Further, the film scanner of the present invention can distinguish between the dummy mount and the mount using the determination means. Therefore, according to the mount carrier unit or the film scanner of the present invention, even when the mounts corresponding to a plurality of orders are accommodated in the inside of the mount accommodating box in a stacked manner and these mounts are continuously scanned, by arranging the dummy mounts such that they are inserted in the boundaries of the orders, it is possible to prepare the index prints and to sort the prints for each order. Further, the mounts in number which is equal to or close to the allowable number of mounts which can be accommodated in the inside of the mount accommodating box can be accommodated in the inside of the box. Accordingly, the number of operations for accommodating the mounts into the inside of the mount accommodating box can be reduced so that the cumbersomeness which follows these operation can be reduced and the time required up to the completion of the scanning can be largely reduced. Accordingly, when an automatic processing is performed, it is unnecessary for an operator to perform the operation while standing beside the scanner.

Further, with the use of the mount carrier unit of the present invention, the dummy mount and the mount can be distinguished from each other using only one first sensor, while with the use of the film scanner of the present invention, the dummy mount and the mount can be distinguished without using a special sensor. Accordingly, the constitution of the device can be simplified in both cases.

Further, according to the mount carrier unit of the present invention, the first sensor outputs the detection result of the pattern which differs depending on whether an object which is transported is the mount or the dummy mount along with the driving of the transport means. Accordingly, by detecting the change of the output pattern of the first sensor, it is possible to confirm that the first sensor has no failure. In the same manner, according to the film scanner of the present invention, whether the mount or the dummy mount is transported can be determined based on the change of image signals obtained by the scanning means. Accordingly, by detecting the change of the image signals, it is possible to confirm that the scanning means or the like has no failure.

It is preferable that the mount carrier unit of the present invention is further comprising a second sensor which is capable of detecting that either one of the mount and the dummy mount is disposed at a given position.

Due to such a constitution, it is possible to determine whether either one of the mount or the dummy mount is transported while taking not only the output signal of the first sensor but also the output signal of the second sensor into consideration so that the more accurate determination can be obtained.

According to the mount carrier unit of the present invention, the first sensor is capable of outputting detection results of patterns different from each other between a case in which the mount is transported by the transport means and a case in which the dummy mount is transported by the transport means based on shapes of the mount and the dummy mount along with the driving of the transport means.

Due to such a constitution, the first sensor outputs the detection result of the patterns which differ based on the shapes of the mount and the dummy mount and hence, the structure of the first sensor can be simplified.

According to the mount carrier unit of the present invention, the first sensor is capable of outputting detection results of patterns different from each other among a case in which the mount is transported by the transport means, a case in which the dummy mount is transported by the transport means and a case neither the mount nor the dummy mount is transported by means of the transport means based on features of the mount and the dummy mount along with the driving of the transport means. On the other hand, in the film scanner of the present invention, the determination means determines whether the mount or the dummy mount is transported by the transport means or whether neither the mount nor the dummy mount is transported based on the change of image signals obtained by the scanning means following the driving of the transport means.

Due to such a constitution, it is not only possible to distinguish between the dummy mount and the mount using the first sensor or the determination means but also to detect that neither dummy mount nor the mount is transported with high accuracy. Accordingly, even when the film scanner is automatically stopped based on the determination that neither the dummy mount nor the mount is transported, there arises substantially no problem and, at the same time, it is possible to prevent the phenomenon that the film scanner is erroneously stopped even when either the dummy mount or the mount is transported. In addition, with the use of this mount carrier unit, as will become apparent from the explanation described hereinafter, it is possible to find out the failure of the first sensor and/or the second sensor with high accuracy.

Other and further objects, features and advantages of the invention will appear more fully from the following description taken in connection with the accompanying drawings.

DESCRIPTION OF THE PREFERRED EMBODIMENTS

Preferred embodiments of the present invention are explained hereinafter in conjunction with drawings.

Figure 1:
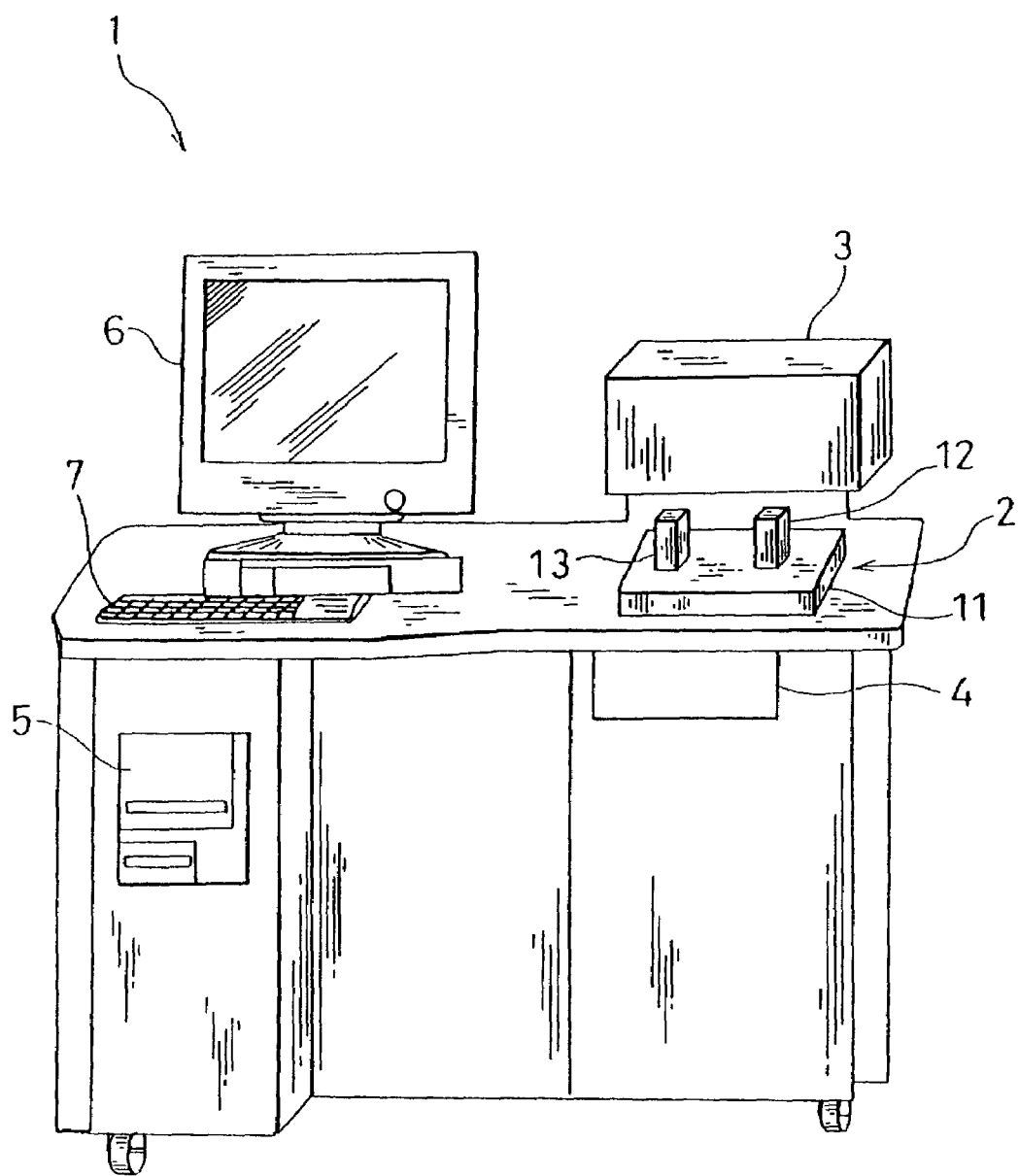
FIG. 1 is an appearance view of a film scanner including a mount carrier unit according to a first embodiment of the present invention.

FIG. 1 is an appearance view of a film scanner including a mount carrier unit according to a first embodiment of the present invention. On the film scanner 1 shown in FIG. 1, a mount carrier unit 2 is replaceably mounted. The mount carrier unit 2 is constituted of a body part 11 having an approximately rectangular parallelepiped shape and two mount accommodating boxes 12, 13 which are respectively mounted in the vicinity of both end portions of the body part 11. With respect to these two mount accommodating boxes 12, 13, one (right side) mount accommodating box 12 constitutes the mount discharge side and the other (left side) mount accommodating box 13 constitutes the mount reception side. That is, mounts accommodated in the mount accommodating box 12 are sequentially discharged therefrom one after another and are accommodated sequentially in the mount accommodating box 13 after scanning.

A light source part 3 which includes a halogen lamp is disposed above the mount carrier unit 2, while an image pick-up part (a scanning means) 4 which includes a CCD line sensor 68 (see FIG. 18) is disposed below the mount carrier unit 2. Further, a personal computer 5 which performs various kinds of processings and a display 6, a keyboard 7 and the like which are connected to the personal computer 5 are arranged on the film scanner 1. Here, a printer processor (not shown in the drawing) which includes a print head 69 (see FIG. 18) which performs the digital exposure of photographic printing papers, a processor which performs development, a sorter 70 (see FIG. 18) which performs sorting of the developed prints are connected to the film scanner 1.

Figure 2:
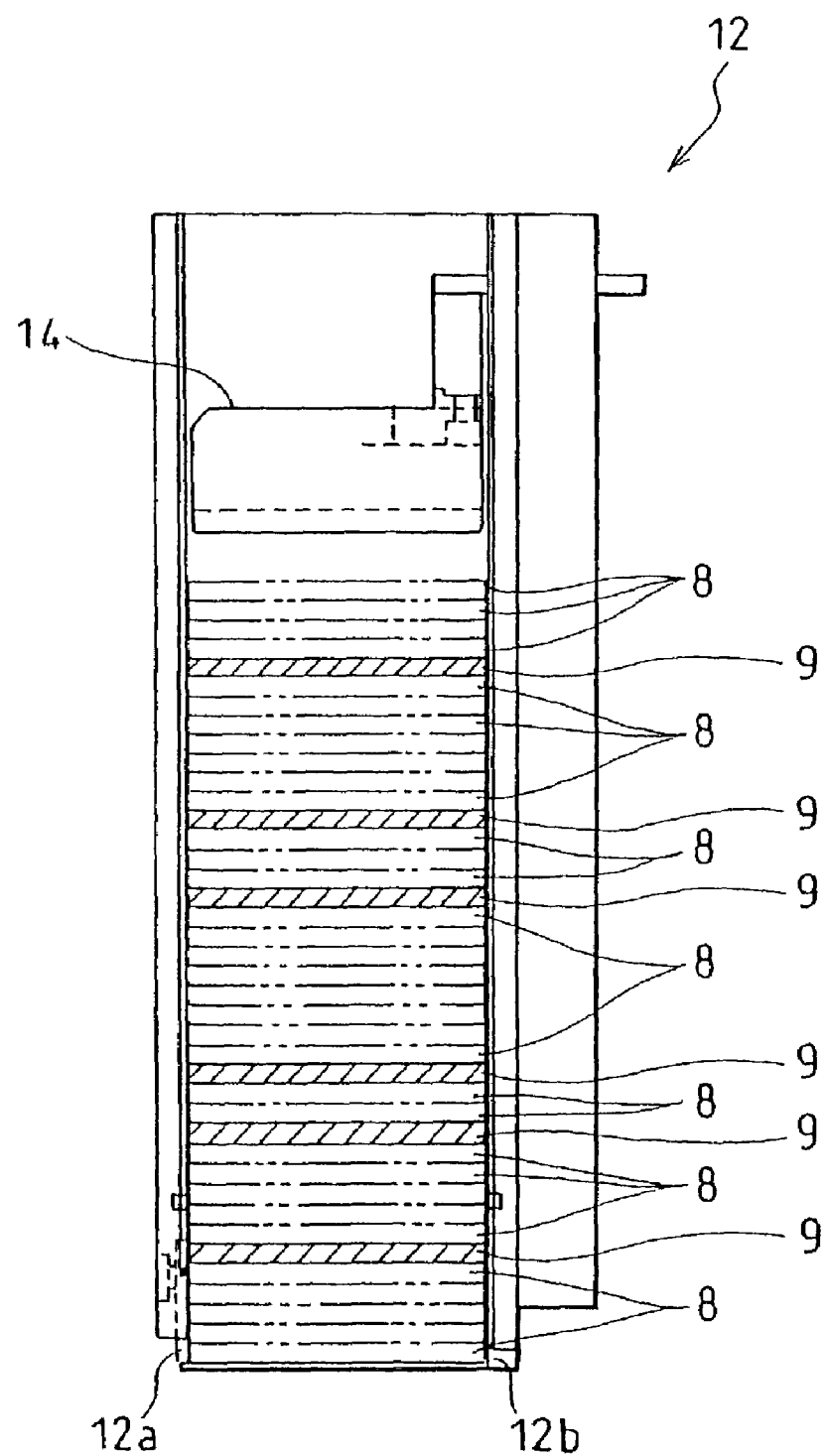
FIG. 2 is a front view of a mount-discharge-side mount accommodating box used in the mount carrier unit shown in FIG. 1.
Figure 3:
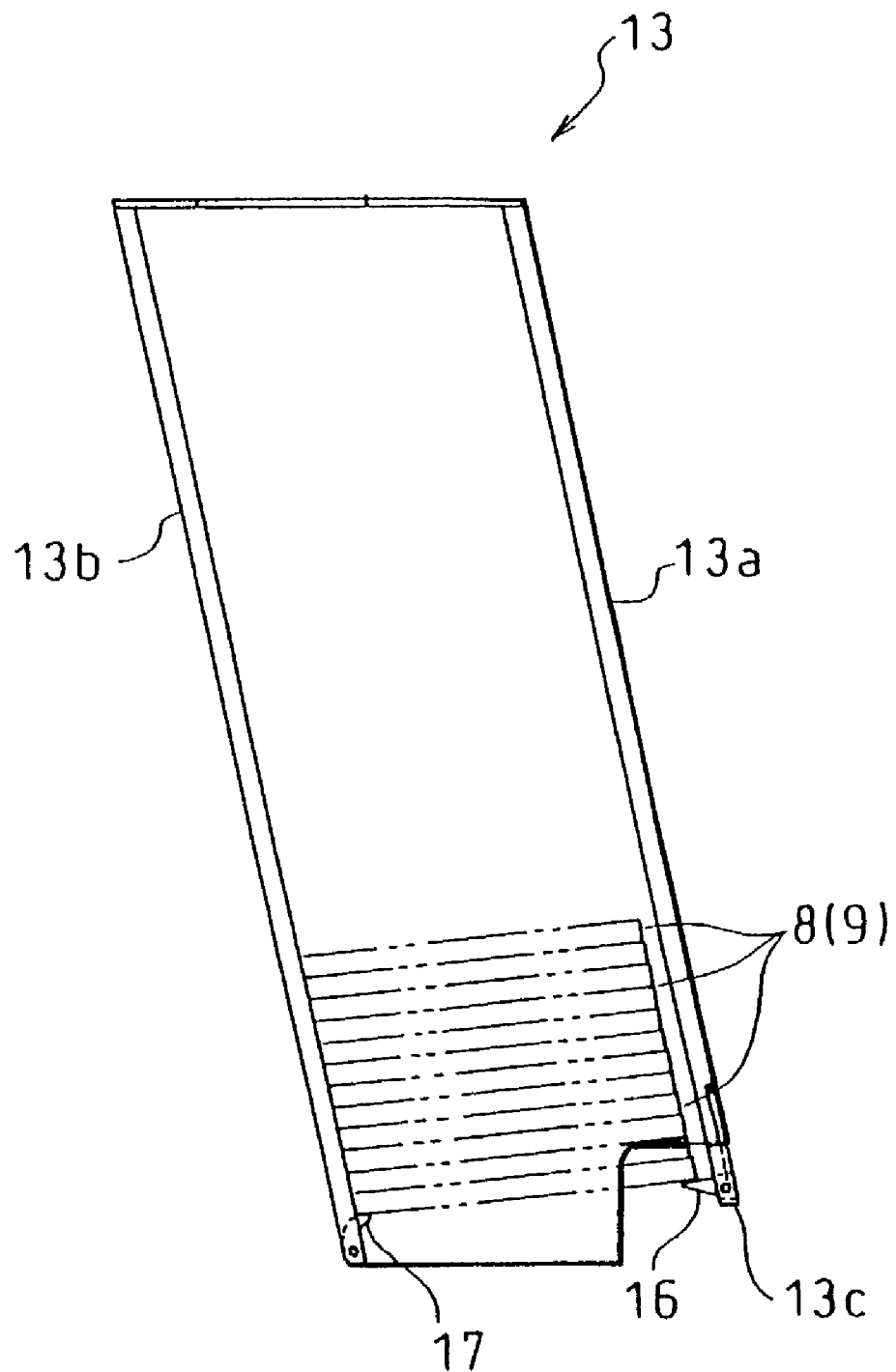
FIG. 3 is a front view of a mount-reception-side mount accommodating box used in the mount carrier unit shown in FIG. 1.
Figure 4:
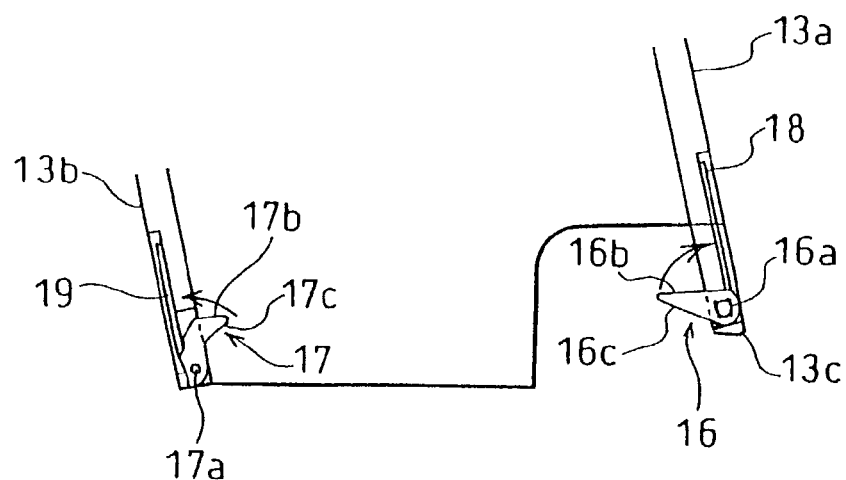
FIG. 4 is an enlarged view of a portion of the mount-reception-side mount accommodating box shown in FIG. 3 in the vicinity of a lower end portion thereof.
Figure 5:
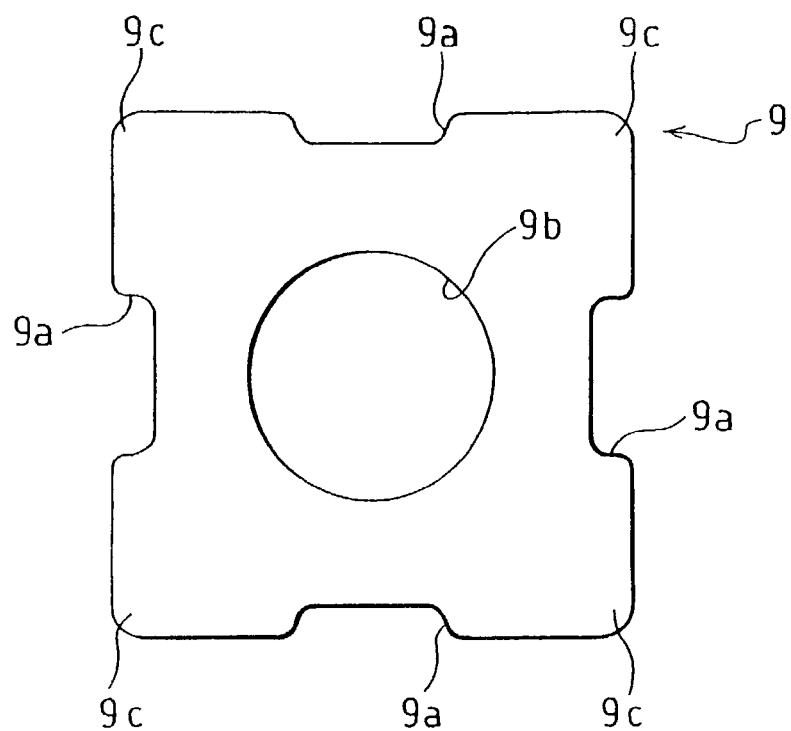
FIG. 5 is a plan view of a dummy mount accommodated in the mount accommodating box together with mounts.

Subsequently, the detailed structure of the mount carrier unit 2 is explained sequentially in the order of the mount accommodating boxes 12, 13 and the body part 11. First of all, the constitution of the mount accommodating box 12, 13 is explained in conjunction with FIG. 2 to FIG. 5. FIG. 2 is a front view of the mount-discharge-side mount accommodating box 12 and FIG. 3 is a front view of the mount-reception-side mount accommodating box 13. FIG. 4 is a partial enlarged view of a portion in the vicinity of a lower end portion of the mount-reception-side mount accommodating box 13. FIG. 5 is a plan view of dummy mount accommodated in the mount accommodating boxes 12, 13 together with the mounts.

As shown in FIG. 2, in the inside of the mount accommodating box 12 formed in an approximately angled cylindrical shape, the mounts 8 in which positive films on which images are recorded are held and dummy mounts 9 which do not hold the positive films are accommodated in a stacked manner. The mounts 8 and the dummy mounts 9 have an approximately square contour and they have substantially the same size and thickness. However, as shown in FIG. 5, the dummy mount 9 is provided with notches 9a in the vicinity of central portions of respective sides of an outer periphery which are disposed between corner portions 9c of the dummy mount 9. Further, an opening 9b having a circular shape is formed in the vicinity of a central portion of the dummy mount 9. The reason that four notches 9a are provided to the dummy mount 9 is that even when the dummy mount 9 is accommodated in the inside of the mount accommodating box 12 in any one direction out of upper, lower, left and right directions, the notch 9a can be detected by a lever 53 which will be explained later (see FIG. 9).

In the inside of the mount accommodating box 12, the mounts 8 are stacked in an arranged manner for every order and one dummy mount 9 is arranged at each boundary portion of the mounts 8 for every order. A weight 14 which is movable in upward and downward directions freely is arranged on an upper portion of the stacked mounts 8 and the dummy mounts 9 so as to apply pressure to the mounts 8 and the dummy mounts 9 downwardly. Although a lower end portion of the mount accommodating box 12 is closed, a mount discharge opening 12a is formed in a portion of a side wall of the mount accommodating box 12 at the mount accommodating box 13 side and in the vicinity of a lower end portion of the side wall. The mount discharge opening 12a has a height which is substantially equal to a thickness of one mount. Further, in a neighboring portion of the lower end portion of a side wall which faces the side wall in which the mount discharge opening 12a is formed in an opposed manner, a hole 12b which allows a mount pusher pawl (a transfer means) 23 (see FIG. 6) mounted on the body part 11 to be inserted into or removed from the inside of the mount accommodating box 12 is formed. Due to such a constitution, the mounts 8 and the dummy mounts 9 which are accommodated in the inside of the mount accommodating box 12 are sequentially pushed out and discharged by the mount pusher pawl 23 in the order from the mount at the lowermost portion.

On the other hand, as shown in FIG. 3, in the inside of the mount accommodating box 13 which is formed in an approximately angled cylindrical shape, the mounts 8 and the dummy mounts 9 can be accommodated such that they are stacked to each other. The mount accommodating box 13 is slightly inclined in the direction which makes an upper portion thereof away from the mount accommodating box 12. Here, out of a pair of side walls 13a, 13b of the mount accommodating box 13 which face each other in an opposing manner, a lower end portion of the side wall 13a disposed at the mount accommodating box 12 side is arranged at a position higher than a lower end portion of the side wall 13b by a thickness of several sheets of mounts. Due to such a constitution, a reception hole 13c which receives the mount 8 and the dummy mount 9 is formed in a lower portion of the side wall 13a of the mount accommodating box 13.

Further, as shown in FIG. 4, the lower end portions of a pair of opposing side walls 13a, 13b of the mount accommodating box 13 have portions thereof in the vicinity of the center respectively bored in a U-shape. Mount holding members (stoppers) 16, 17 have one end sides thereof respectively supported on these bored portions such that the mount holding members 16, 17 are tiltable about supporting shafts 16a, 17a which are mounted on the lower end portions of respective side walls 13a, 13b. Further, to prevent the mount holding members 16, 17 from projecting to the outside of the respective side walls 13a, 13b, on portions outside the above-mentioned U-shaped bored portions, spring plates 18, 19 which restrict the tilting angle of the mount holding members 16, 17 are mounted. On the other hand, to prevent the interference between the mount holding members 16, 17 and the side walls 13a, 13b, the mount holding members 16, 17 are configured such that they are not tiltable in the direction away from the spring plates 18, 19 by preventing an angle made by one surfaces 16b, 17b with respect to a horizontal plane from exceeding a given angle (substantially equal to an inclination angle of the side wall 13a). That is, the mount holding members 16, 17 assume an inner position (holding position) corresponding to the above-mentioned given angle due to a dead weight thereof when an external force is not applied to the mount holding members 16, 17 (the same goes for a case in which a force is applied to the surfaces 16b, 17b from above) and assume an outer position (passing position) in which the mount holding members 16, 17 are brought into contact with the spring plates 18, 19 when a force from below is applied to the surfaces 16c, 17c which face the surfaces 16b, 17b in an opposed manner. When the mount holding members 16, 17 assume the outer position, the thickness of the mount holding members 16, 17 is substantially absorbed by the thickness of the side walls 13a, 13b. Accordingly, in this state, the mount holding members 16, 17 are substantially not projected from inner surfaces of the side walls 13a, 13b.

Figure 6:
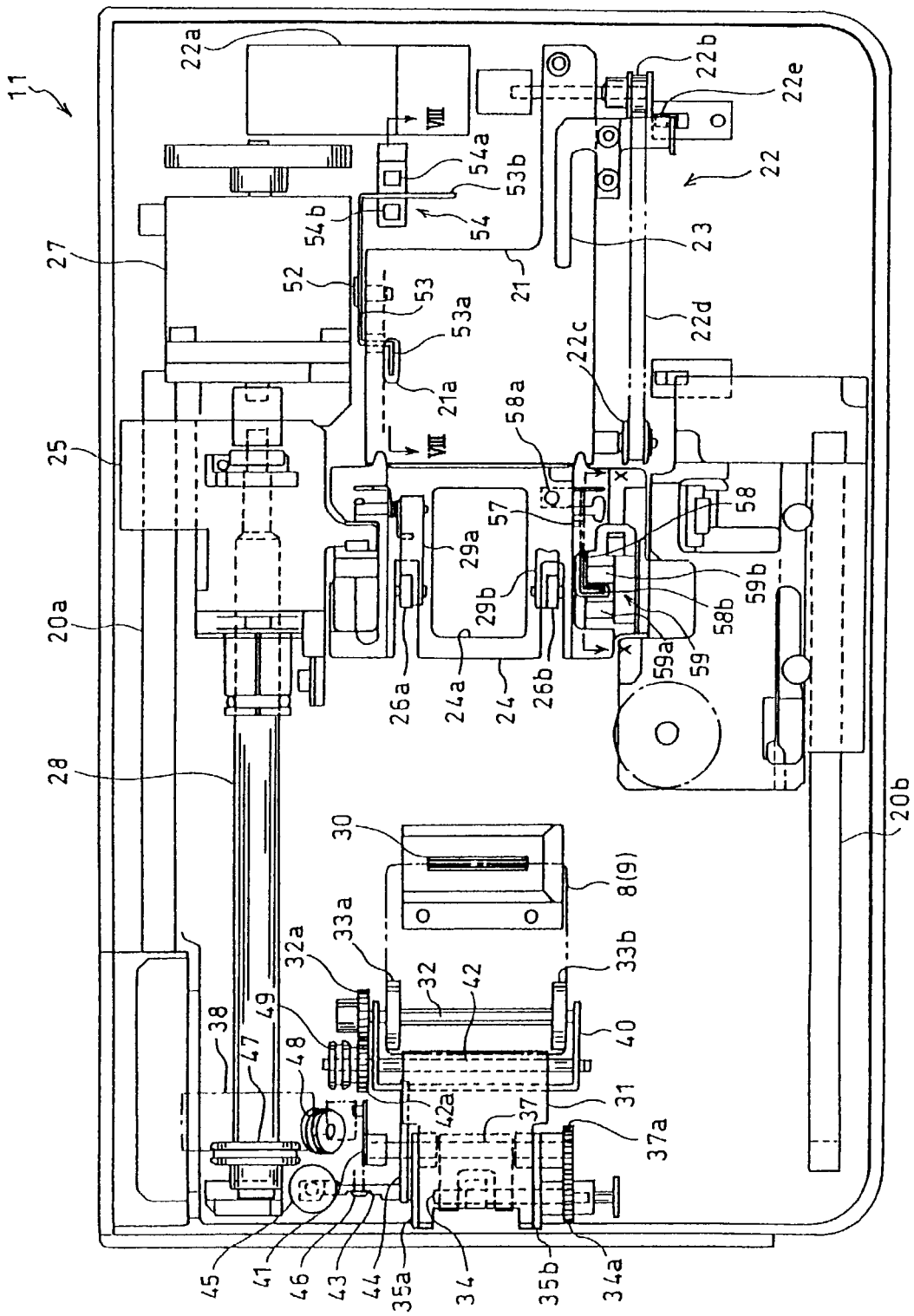
FIG. 6 is a plan view of a body part of the mount carrier unit shown in FIG. 1.
Figure 7:
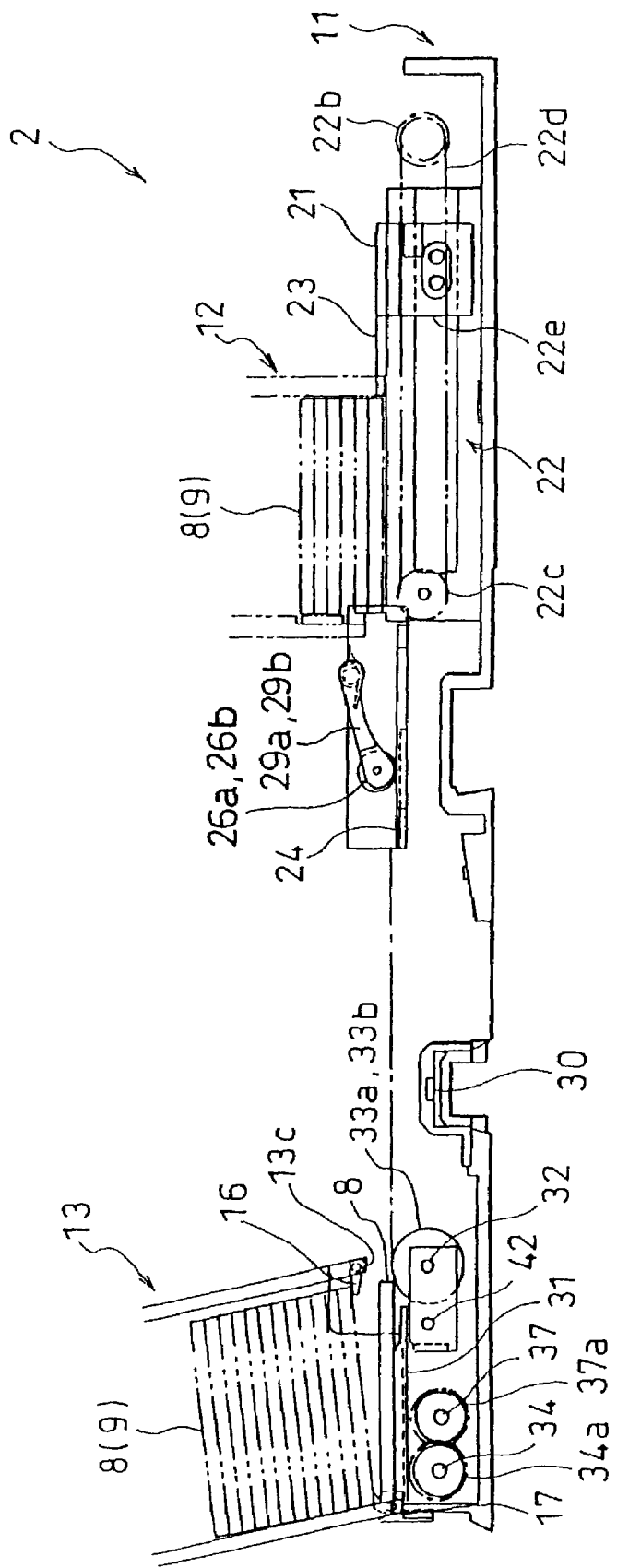
FIG. 7 is a front view of the mount carrier unit shown in FIG. 1.
Figure 8:
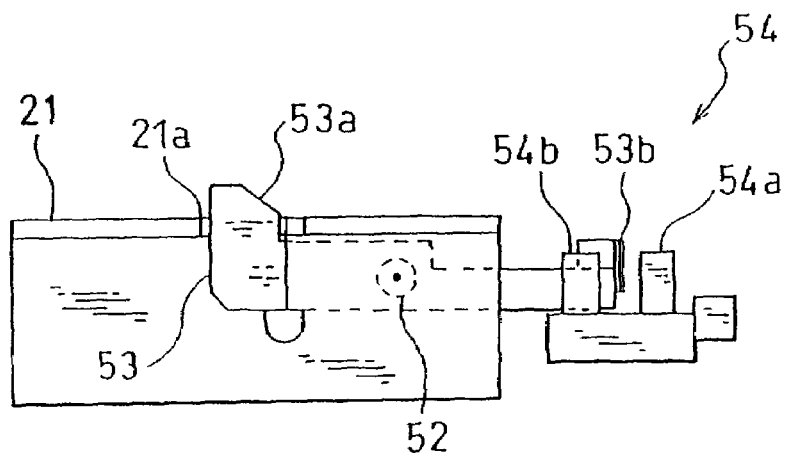
FIG. 8 is a cross-sectional view taken along a line VIII—VIII of FIG. 6.
Figure 9:
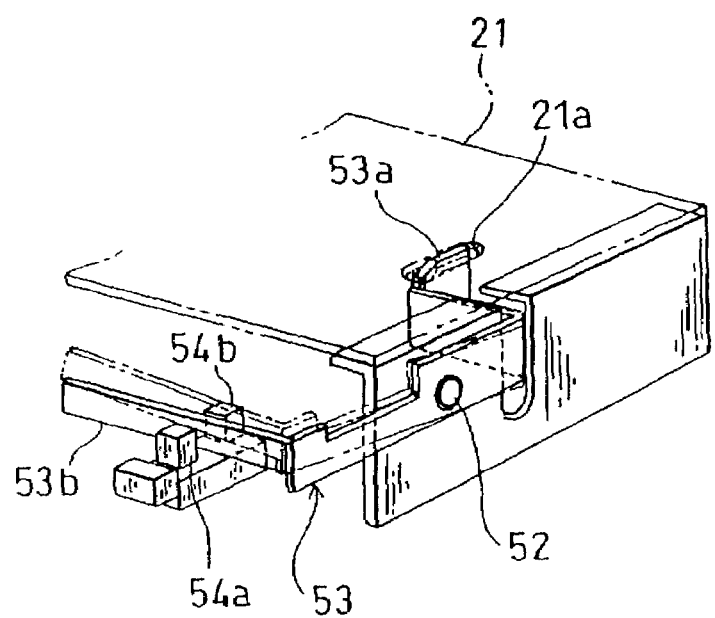
FIG. 9 is a perspective view of a portion depicted in FIG. 8.
Figure 10:
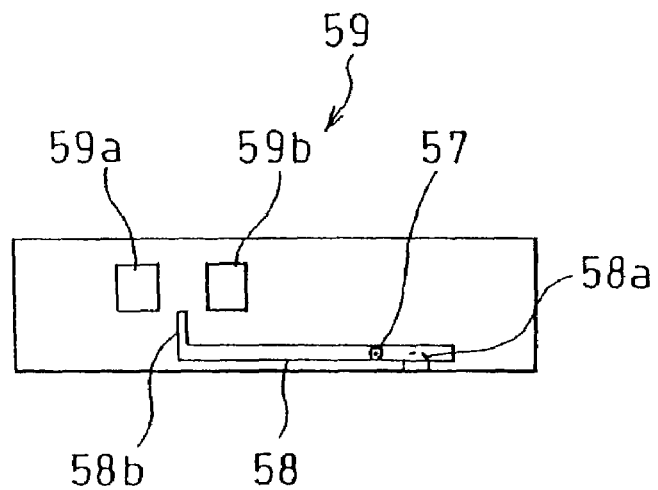
FIG. 10 is a cross-sectional view taken along a line X—X of FIG. 6.
Figure 11:
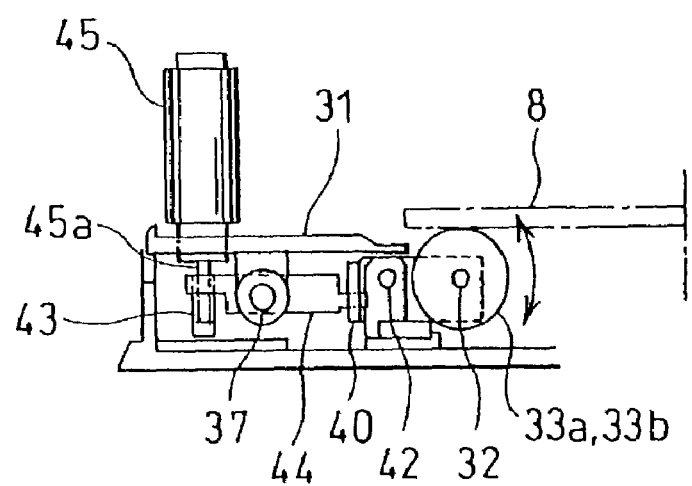
FIG. 11 is a side view for explaining an elevating mechanism of discharge rollers housed in the body part of the mount carrier unit shown in FIG. 1.
Figure 12:
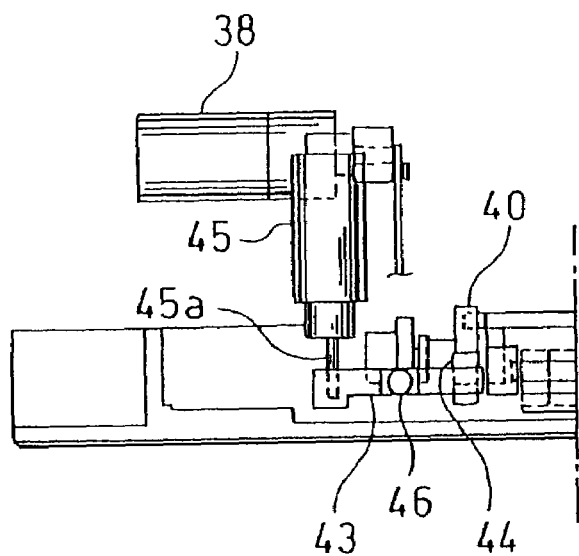
FIG. 12 is a side view for explaining the elevating mechanism of the discharge rollers as viewed in the direction perpendicular to FIG. 11.
Figure 13:
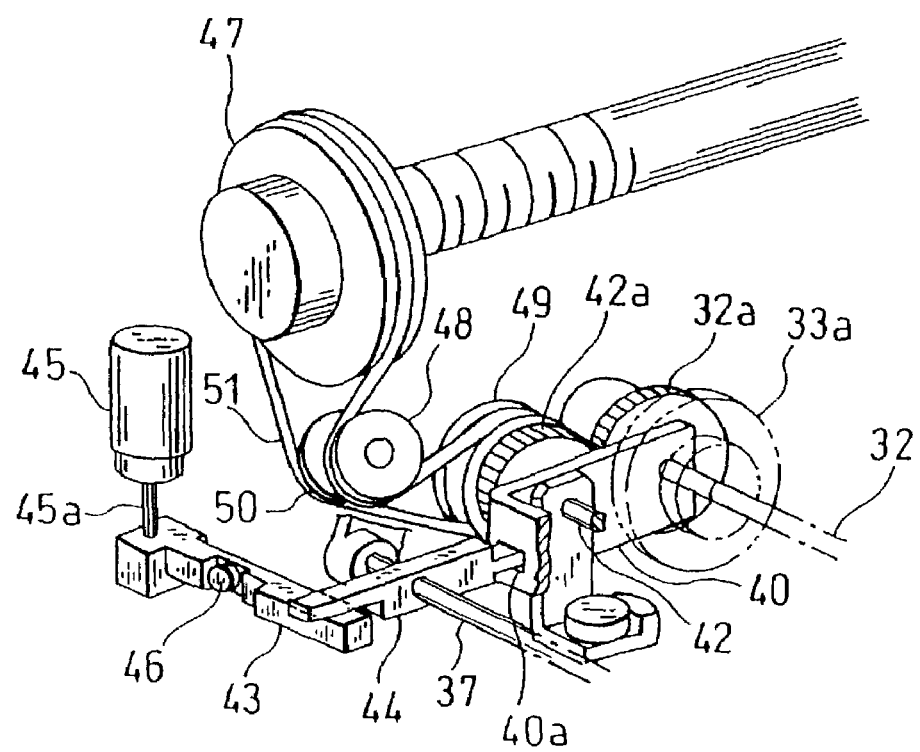
FIG. 13 is a perspective view for explaining the elevating mechanism and the rotating mechanism of the discharge rollers.
Figure 14:
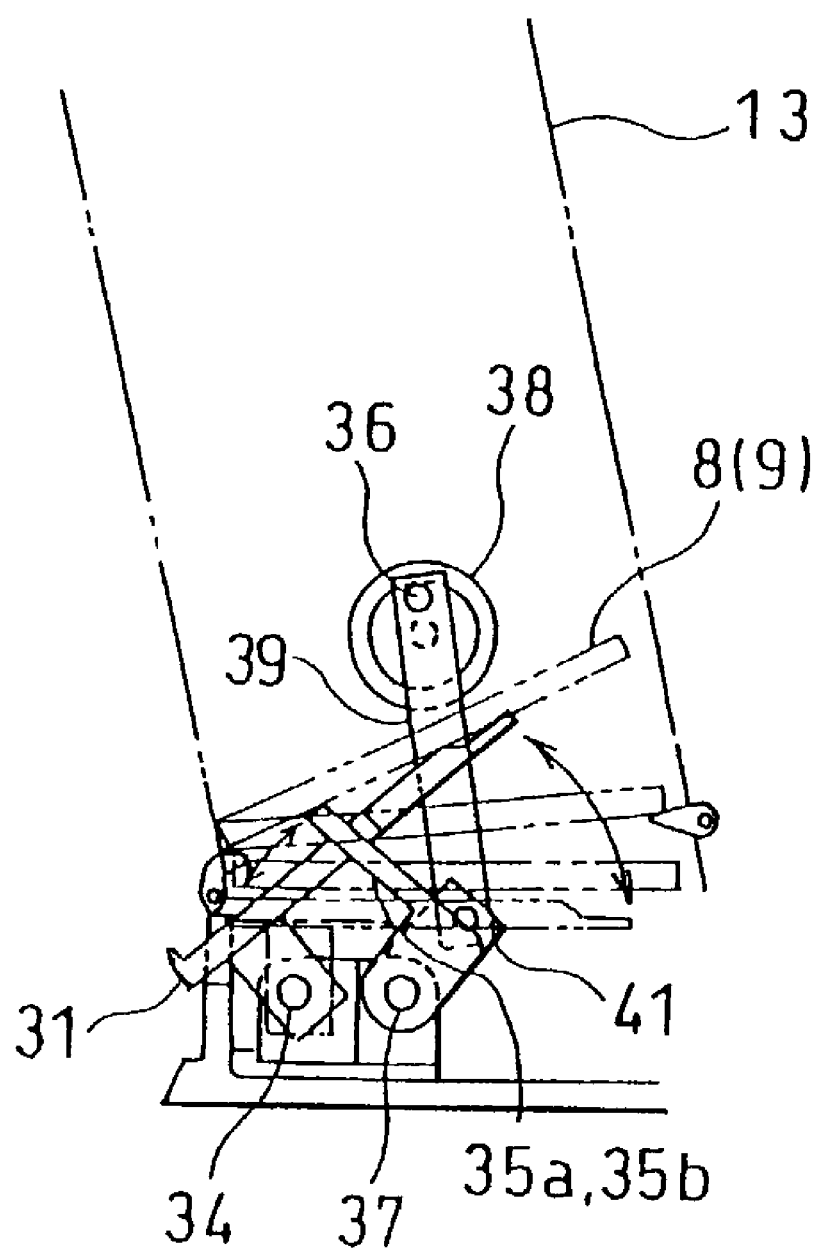
FIG. 14 is a side view for explaining an elevating mechanism of a mount base housed in the body part of the mount carrier unit.
Figure 15:
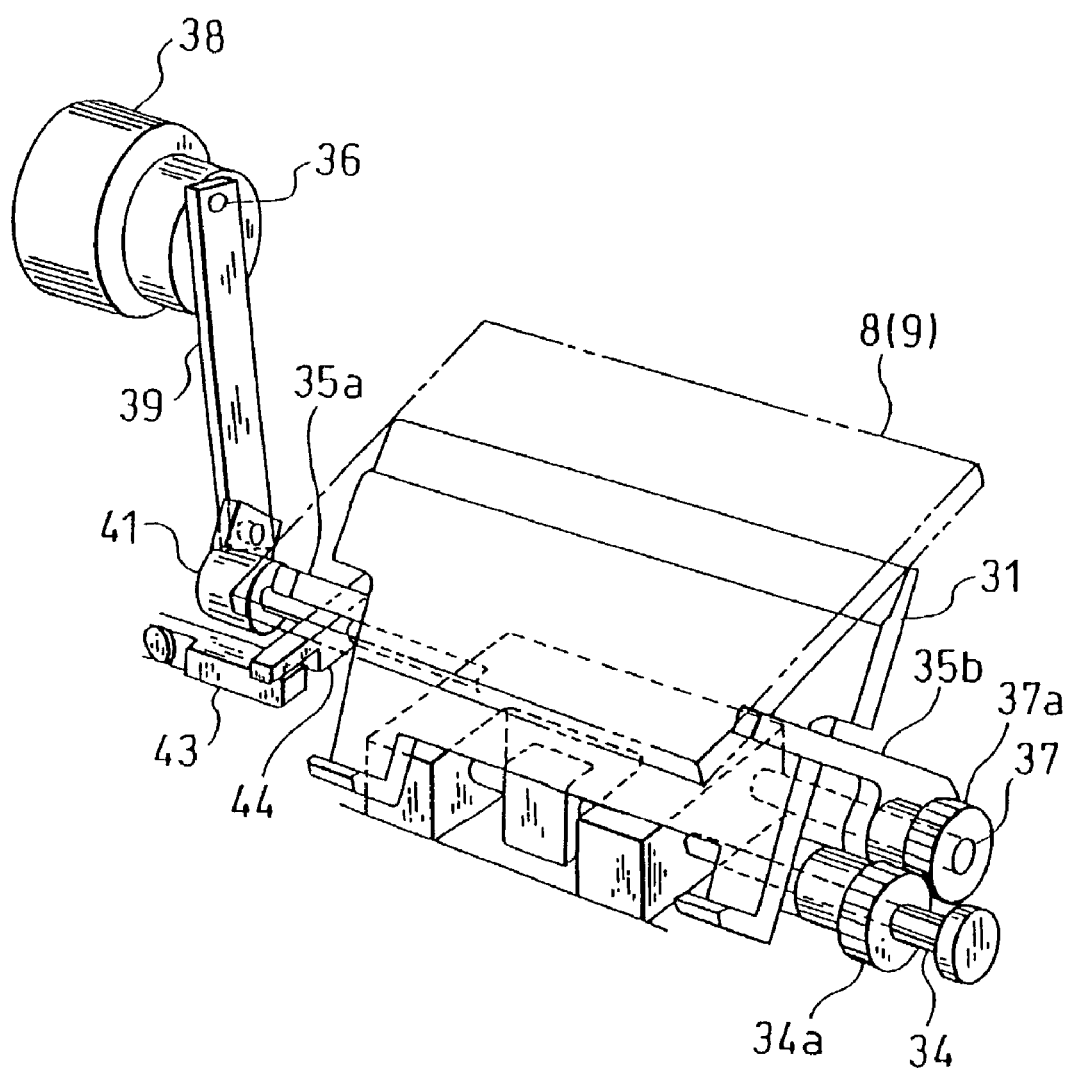
FIG. 15 is a perspective view of the elevating mechanism of the mount base depicted in FIG. 14.

Subsequently, the structure of the body part 11 is explained in conjunction with FIG. 6 to FIG. 15. FIG. 6 is a plan view of the body part 11 of the mount carrier unit 2. FIG. 7 is a front view of the mount carrier unit 2. FIG. 8 is a cross-sectional view taken along a line VIII—VIII of FIG. 6. FIG. 9 is a perspective view of a portion depicted in FIG. 8. FIG. 10 is a cross-sectional view taken along a line X—X of FIG. 6. FIG. 11 is a side view for explaining an elevating mechanism of discharge rollers housed in the body part 11 of the mount carrier unit 2. FIG. 12 is a side view for explaining the elevating mechanism of the discharge rollers as viewed in the direction perpendicular to FIG. 11. FIG. 13 is a perspective view for explaining the elevating mechanism and the rotating mechanism of the discharge rollers. FIG. 14 is a side view for explaining an elevating mechanism of a mount base housed in the body part 11 of the mount carrier unit 2. FIG. 15 is the perspective view of the elevating mechanism.

As shown in FIG. 6, a movable plate 25 which holds a movable base 24 in which an opening 24a is formed in a portion other than a peripheral portion is arranged on the body part 11. On the movable base 24, the mount 8 or the dummy mount 9 (see FIG. 2 and FIG. 3) which is discharged from the mount accommodating box 12 is mounted. The mount 8 which is mounted on the movable base 24 is pressed from above by means of two mount pressing rollers 26a, 26b which are mounted on distal ends of a pair of arms 29a, 29b supported on the movable plate 25 so as to prevent the mount 8 from being moved easily on the movable base 24. Here, in FIG. 6, the illustration of a proximal portion of the arm 29b is omitted.

The movable plate 25 is movable in the horizontal direction along rails 20a, 20b by rotatably driving a ball screw 28 using a pulse motor 27. The movable base 24 is assembled and adjusted using an assembling jig so as to make the movable base 24 moved in the direction (sub scanning direction) perpendicular to the main scanning direction of scanning by the image pick-up part 4.

As shown in FIG. 6 and FIG. 7, when the movable plate 25 assumes the rightmost position, a flat-plate-like insertion stocker mounting plate 21 on which the mount accommodating box 12 is mounted is disposed close to the movable base 24 and slightly higher than the movable base 24. Further, at a side portion of the insertion stocker mounting plate 21, a pusher pawl driving mechanism 22 which includes a motor 22a forming a driving source, a pair of pulleys 22b, 22c connected to the motor 22a, a belt 22d extended between the pulleys 22b, 22c, and a pawl holding member 22e which is supported on the belt 22d is arranged. The pusher pawl driving mechanism 22 holds the mount pusher pawl 23 which is disposed on the insertion stocker mounting plate 21 by means of the pawl holding member 22e. Due to such a constitution, the mount pusher pawl 23 is capable of reciprocably moving along the moving direction of the movable plate 25 on the insertion stocker mounting plate 21.

As shown in FIG. 6, FIG. 8 and FIG. 9, at a position close to the insertion stocker mounting plate 21, a photo coupler (first sensor) 54 which constitutes a sensor consisting of a light emitting portion 54a and a light receiving portion 54b which are arranged to face each other in an opposed manner and a lever 53 which is rotatable about a shaft 52 are arranged. A top portion 53a which is formed on one end side of the lever 53 is disposed at a position corresponding to a hole 21a formed in the insertion stocker mounting plate 21. Further, the hole 21a is disposed at a position corresponding to the notch 9a formed in the dummy mount 9 accommodated in the mount accommodating box 12. The lever 53 is biased in the direction which the top portion 53a is moved upwardly by a coil spring not shown in the drawing which is supported on the shaft 52. Further, a portion 53b which constitutes the other end side of the lever 53 is bent and is extended in the same direction with the shaft 52 such that the portion 53b passes between the light emitting portion 54a and the light receiving portion 54b of the photo coupler 54 when the top portion 53a of the lever 53 is projected from the hole 21a.

Accordingly, when the dummy mount 9 is mounted on the insertion stocker mounting plate 21 or neither the mount 8 nor the dummy mount 9 is mounted on the insertion stocker mounting plate 21 (that is, when the dummy mount 9 is accommodated in the mount accommodating box 12 at the lowermost position or neither the mount 8 nor the dummy mount 9 is accommodated in the mount accommodating box 12), the top portion 53a of the lever 53 and the notch 9a of the dummy mount 9 face each other in an opposed manner and hence, the top portion 53a of the lever 53 is projected from the hole 21a whereby the light emitted from the light emitting portion 54a to the light receiving portion 54b is interrupted by the portion 53b of the lever 53 (this state being referred to as "detection OFF state" of the photo coupler 54). On the other hand, when the mount 8 is mounted on the insertion stocker mounting plate 21 (that is, when the mount 8 is accommodated in the inside of the mount accommodating box 12 at the lowermost position), the top portion 53a of the lever 53 is pushed downwardly by the mount 8 so that the top portion 53a of the lever 53 is not projected from the hole 21a whereby the light emitted from the light emitting portion 54a to the light receiving portion 54b is not interrupted by the portion 53b of the lever 53 (this state being referred to as "detection ON state" of the photo coupler 54).

Figure 16:
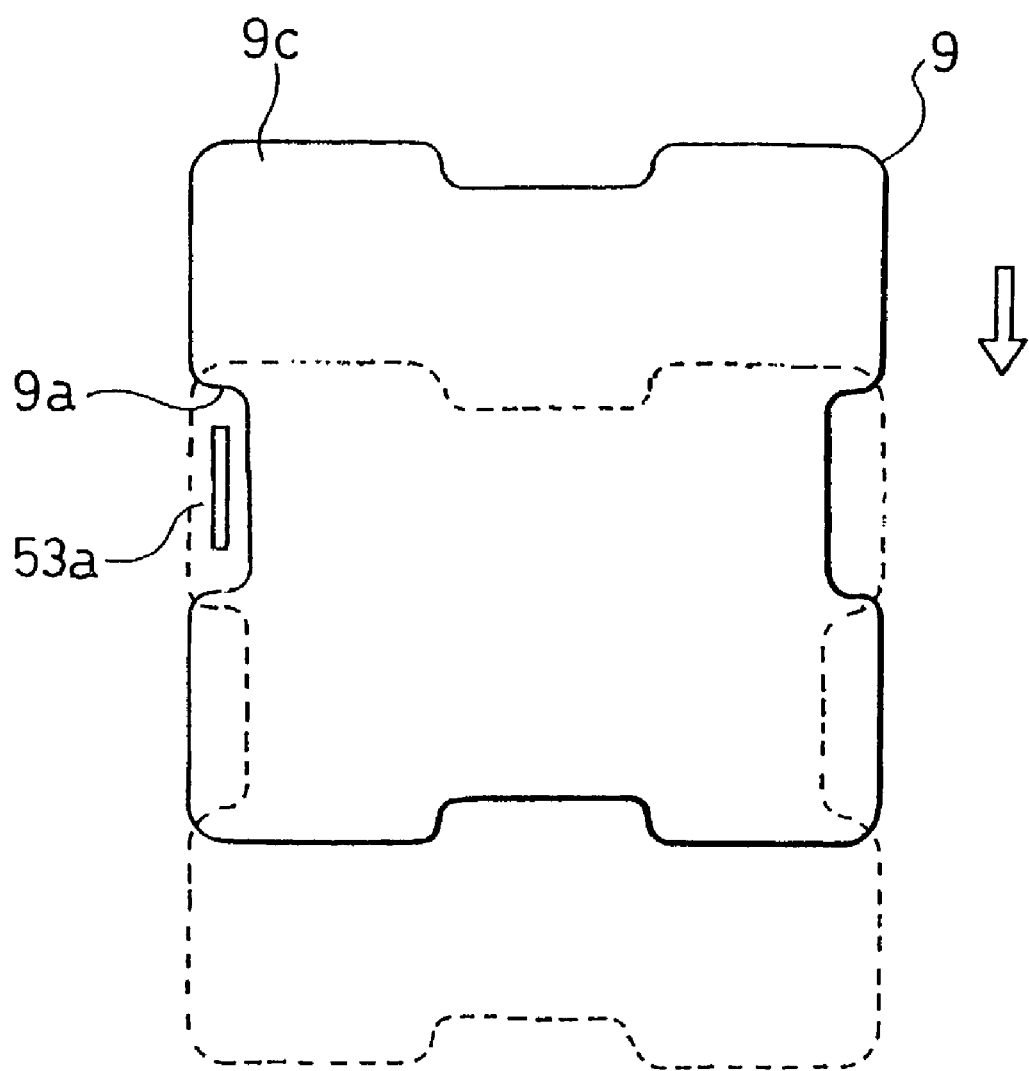
FIG. 16 is a view for explaining the change of a sensor output generated corresponding to the movement of the dummy mount shown in FIG. 5.

However, when the mount 8 or the dummy mount 9 which is disposed at the lowermost position of the mount accommodating box 12 is started to move toward the movable base 24 due to the pusher pawl 23 upon driving of the pusher pawl driving mechanism 22 and some time lapses thereafter, there is a case that a signal outputted from the light receiving portion 54b is changed depending on an object which is mounted on the insertion stocker mounting plate 21. That is, when the dummy mount 9 is mounted on the insertion stocker mounting plate 21, due to the movement of the dummy mount 9 driven by the pusher pawl 23 in the arrow direction, the state of the dummy mount 9 is shifted from a state in which the top portion 53a of the lever 53 and the notch 9a of the dummy mount 9 face each other in an opposed manner as indicated by a solid line in FIG. 16 to a state in which the top portion 53a of the lever 53 faces the corner portion 9c of the dummy mount 9 in an opposed manner as indicated by a broken line in FIG. 16. As a result, the top portion 53a of the lever 53 is pushed downwardly so that the top portion 53a of the lever 53 is not projected from the hole 21a whereby the light emitted toward the light receiving portion 54b from the light emitting portion 54a is not interrupted by the portion 53b of the lever 53. Accordingly, in accordance with such an operation, the photo coupler 54 is changed from the detection OFF state to the detection ON state (that is, an output signal of the light receiving portion 54b being changed from OFF to ON).

Figure 17:
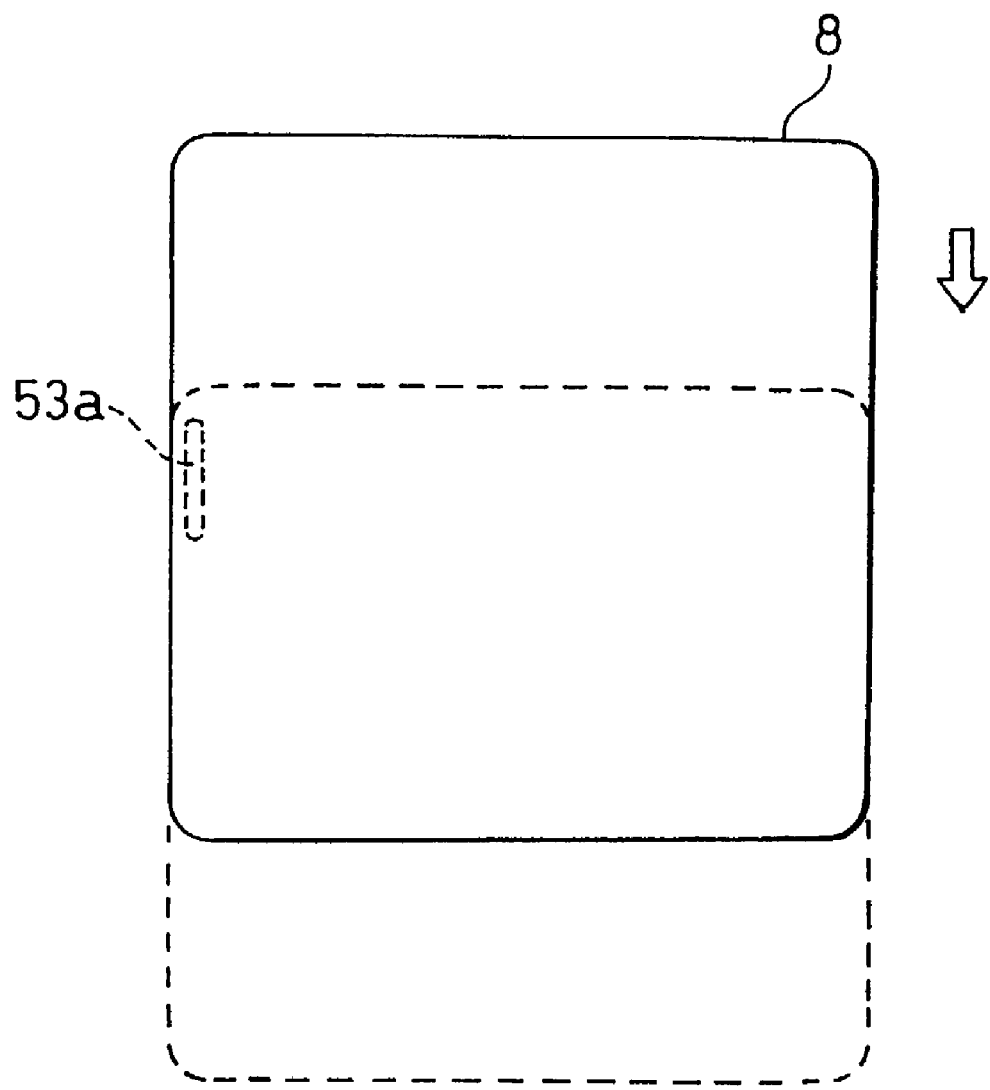
FIG. 17 is a view for explaining the change of the sensor output generated along with the movement of the mount.

On the other hand, when the mount 8 is mounted on the insertion stocker mounting plate 21, even when the mount 8 driven by the pusher pawl 23 is moved in the arrow direction, as shown in a solid line and a broken line in FIG. 17, the top portion 53a of the lever 53 maintains a state in which the top portion 53a faces the mount 8 in an opposed manner and hence, the photo coupler 54 maintains the detection ON state and does not change the state. In the same manner, when neither the mount 8 nor the dummy mount 9 is mounted on the insertion stocker mounting plate 21, even when the pusher pawl 23 is driven, the photo coupler 54 maintains the detection OFF state and does not change the state.

The output signal of the light receiving portion 54b is supplied to the controller 61 (see FIG. 18) disposed in the inside of the personal computer 5 and this controller 61 determines whether the mount 8 is transported or not along with driving of the pusher pawl 23, whether the dummy mount 9 is transported or not along with driving of the pusher pawl 23, and whether neither of the mount 8 nor the dummy mount 9 is transported or not.

In this manner, the mount carrier unit 2 of this embodiment can output a signal which distinguishes among the case in which the mount 8 is present on the insertion stocker mounting plate 21, the case in which the dummy mount 9 is present on the insertion stocker mounting plate 21, and the case in which neither the mount 8 nor the dummy mount 9 is present on the insertion stocker mounting plate 21 based on only the change of the output signal of the light receiving portion 54b. That is, when the photo coupler 54 maintains the detection ON state along with the driving of the pusher pawl 23, this means that the mount 8 was present on the insertion stocker mounting plate 21. When the photo coupler 54 is changed from the detection OFF state to the detection ON state along with the driving of the pusher pawl 23, this means that the dummy mount 9 was present on the insertion stocker mounting plate 21. When the photo coupler 54 maintains the detection OFF state along with the driving of the pusher pawl 23, this means that neither the mount 8 nor the dummy mount 9 was present on the insertion stocker mounting plate 21.

Further, as shown in FIG. 6 and FIG. 10, at a position close to the movable base 24, a photo coupler (second sensor) 59 which constitutes a sensor formed by arranging a light emitting portion 59a and a light receiving portion 59b in an opposed manner and a lever 58 which is rotatable about a shaft 57 are arranged. A top portion 58a formed on one end side of the lever 58 is disposed at a position corresponding to a hole (not shown in the drawing) which is formed in the movable base 24. This hole is disposed at a position corresponding to the mount 8 and a portion in the vicinity of the corner portion 9c of the dummy mount 9 which are mounted on the movable base 24. The lever 58 is biased in the direction which moves the top portion 58a thereof upwardly by means of a coil spring which is supported on the shaft 57 although not shown in the drawing. Further, a portion 58b which constitutes the other end side of the lever 58 is bent and extended in the same direction as the shaft 57 so as to allow the portion 58b to pass between the light emitting portion 59a and the light receiving portion 59b of the photo coupler 59 when the top portion 58a of the lever 58 is not projected from the hole.

Accordingly, when either the mount 8 or the dummy mount 9 is mounted on the movable base 24, the top portion 58a of the lever 58 faces the mount 8 or the corner portion 9c of the dummy mount 9 in an opposed manner and hence, the top portion 58a of the lever 58 is pushed downwardly by the mount 8 or the dummy mount 9 so that the top portion 58a of the lever 58 is not projected from the hole 24a whereby light emitted from the light emitting portion 59a to the light receiving portion 59b is interrupted by the portion 58b of the lever 58. On the other hand, neither the mount 8 nor the dummy mount 9 is mounted on the movable base 24, the top portion 58a of the lever 58 is projected from the hole 24a so that the light emitted from the light emitting portion 59a to the light receiving portion 59b is not interrupted by the portion 58b of the lever 58. In this manner, with respect to the mount carrier unit 2 of this embodiment, the case in which either the mount 8 or the dummy mount 9 is mounted on the movable base 24 and the case in which neither of them is mounted on the movable base 24 can be distinguished based on the output signal of the light receiving portion 59b. Then, the output signal of the light receiving portion 59b is supplied to the controller 61 arranged in the inside of the personal computer 5.

Accordingly, as will be explained in detail later, in this embodiment, by performing the determination with the controller 61 by combining the change pattern of the output signal from the light receiving portion 54b of the photo coupler 54 along with the driving of the pusher pawl 23 and the output signal from the light receiving portion 59b of the photo coupler 59, the case in which the mount 8 is mounted on the movable base 24, the case in which the dummy mount 9 is mounted on the movable base 24, and the case in which neither of them is mounted on the movable base 24 can be accurately distinguished from each other.

In this manner, according to the mount carrier unit 2 of this embodiment, the dummy mount 9 can be distinguished from the mount 8 using the output signals of the light receiving portions 54b, 59b so that even when the mounts 8 corresponding to a plurality of orders are accommodated in a stacked manner in the inside of the mount accommodating box 12 and these mounts are continuously subjected to scanning, by merely arranging the dummy mounts 9 such that the dummy mount 9 is inserted into the boundary between the mounts of respective orders, it is possible to prepare index prints using a printer processor connected to the film scanner 1 or to sort the prints for every order. Further, it is possible to accommodate the number of mounts 8 which is equal to or close to the allowable accommodation number into the mount accommodating box 12 so that the number of operations to accommodate the mounts into the mount accommodating box 12 can be reduced whereby the cumbersomeness which follows these operations can be reduced and the time required to the completion of the scanning can be largely reduced. Accordingly, when the automatic processing is performed, it is unnecessary for an operator to perform the operations while always standing beside the film scanner 1. Further, when all of the mounts 8 are discharged from the inside of the mount accommodating box 12, this can be detected and the film scanner 1 can be stopped automatically in response to the detection.

Further, as shown in FIG. 6, in a portion of a lower surface of the body part 11 which is on the moving path of the movable base 24, a slit 30 which supplies light emitted from the light source part 3 and transmitted through the film to the image pick-up part 4 is formed. The slit 30 is oriented in the element arrangement direction (main scanning direction) in conformity with the position of a CCD line sensor 68 (see FIG. 18) arranged in the image pick-up part 4.

As shown in FIG. 6 and FIG. 11 to FIG. 13, a planar mount base 31 on which the mount accommodating box 13 is mounted is disposed at a position which is opposite to the insertion stocker mounting plate 25 with the slit 30 sandwiched between the mount base 31 and the insertion stocker mounting plate 21. The movable plate 25 is disposed close to the movable base 24 when the movable plate 25 is disposed at the leftmost position. A pair of discharge rollers 33a, 33b which are provided with ceramic coating machining for preventing slippage on surfaces thereof are arranged between the right end of the mount base 31 and the slit 30. The discharge roller 33a, 33b are extended perpendicularly with respect to the moving direction of the movable plate 25 and is fixedly mounted on the shaft 32 which is movable in the up and down directions.

Both ends of the shaft 32 are respectively connected to portions of an approximately U-shaped arm 40 in the vicinity of open ends of the arm 40. The arm 40 is rotatably supported on a shaft 42 which is disposed at the left side of the open ends of the arm 40 and parallel to the shaft 32. Further, a hole 40a is formed in a left end face of the arm 40 and one end portion of a link member 44 is inserted into the hole 40a. The link member 44 is rotatably supported on a shaft 37 which is disposed at the left side of the shaft 42 and is extended parallel to the shaft 42. Further, the link member 44 has the other end portion thereof mounted on one end portion of a link member 43. The link member 43 is rotatably supported on a shaft 46 which is extended perpendicular to the shafts 37, 42 and has the other end thereof positioned below a solenoid 45. The other end of the link member 43 is pushed downwardly by a pin 45a which has a lower end thereof projected downwardly when a switch of the solenoid 45 is turned on.

Due to such a constitution, when the switch of the solenoid 45 is turned on, the link member 43 is rotated about the shaft 46 and lifts the other end portion of the link member 44. Accordingly, the link member 44 is rotated about the shaft 37 and pushes the left end portion of the arm 40 downwardly. As a result, the arm 40 is rotated about the shaft 42 and lifts the shaft 32 and the discharge rollers 33a, 33b. That is, in the mount carrier unit 2, since the shaft 32 and the discharge rollers 33a, 33b are connected to the solenoid 45 by way of the arm 40 and the link members 43, 44, by controlling the solenoid 45, it is possible to elevate or lower the shaft 32 and the discharge rollers 33a, 33b by way of the link members 43, 44 and the arm 40.

Further, as shown in FIG. 6 and FIG. 13, the shaft 42 supports a gear 42a and a pulley 49 on one end side thereof. The gear 42a is meshed with a gear 32a which is supported on the shaft 32. A belt 51 having a circular cross section is wound around the pulley 49. Further, this belt 51 having the circular cross section is also wound around a pulley 47 supported on the ball screw 28 and pulleys 48, 50 which are served for compensating for the difference in height between two pulleys 47, 49. Due to such a constitution, when the ball screw 28 is rotated to move the movable plate 25, this rotation is transmitted to the shaft 42 and the shaft 32 by way of the pulleys 47, 48, 49 and 50 so that the discharge rollers 33a, 33b are rotated.

When the movable plate 25 approaches the left side position after completion of the scanning, the discharge rollers 33a, 33b are moved upwardly by controlling the solenoid 45 in the above-mentioned manner. Then, the discharge rollers 33a, 33b are brought into contact with the lower surface of the mount 8 or the dummy mount 9 which is pushed from above by mount pushing rollers 26a, 26b and the mount 8 or the dummy mount 9 mounted on the movable base 24 is transferred to the left due to a transferring force generated by the rotation of the mount 8 or the dummy mount 9 per se. Accordingly, the mount 8 or the dummy mount 9 which has been already subjected to the scanning is mounted on the mount base 31.

In this manner, according to the mount carrier unit 2, with the provision of the elevatable discharge rollers 33a, 33b, it is possible to shorten the distance between the scanning position where the slit 30 is formed and the discharge rollers 33a, 33b while preventing the discharge rollers 33a, 33b from being in contact with the mount 8 or the dummy mount 9 until the scanning is completed. Accordingly, it is possible to miniaturize the mount carrier unit 2 by particularly making the size of the mount 8 in the feeding direction (left-and-right direction) short and it is also possible to obtain the high quality image data free from the adverse influence which is brought about by the contact of the discharge rollers 33a, 33b with the mount 8 during the scanning.

Further, in the mount carrier unit 2, a drive source for allowing the discharge rollers 33a, 33b to feed the mount 8 or the dummy mount 9 to the mount base 31 is constituted of one pulse motor 27 which is also used as the drive source for transporting the mount 8 or the dummy mount 9 to the scanning position. Accordingly, the mechanism to rotate the discharge roller 33a, 33b can be largely simplified.

Here, with respect to the mount carrier unit 2, as shown in FIG. 7, the mount base 31 is arranged below the mount holding members 16, 17 such that the mount base 31 is disposed away from the mount 8 or the dummy mount 9 which are held by the mount holding members 16, 17 disposed at the inner position and are arranged at the lowermost side in the inside of the mount accommodating box 13 by approximately 2.5 sheets of the mount 8 at the mount holding member 16 side and by approximately 1.5 sheets of the mount 8 at the mount holding member 17 side. Due to such a constitution, even when the surfaces of the discharge rollers 33a, 33b are slippery, it is possible to feed the mount 8 or the dummy mount 9 to the mount base 31 with a relatively small feeding force.

Further, as shown in FIG. 6, FIG. 14 and FIG. 15, the mount base 31 is rotatably supported on the shaft 34 which is disposed parallel to and at the left side of the shaft 37 such that an upper surface of the mount base 31 assumes a horizontal plane usually. Further, at both sides of the mount base 31, push-up levers 35a, 35b are arranged. The push-up levers 35a, 35b are rotatably supported on the shaft 37 such that the push-up levers 35a, 35b are extended in the horizontal direction usually. The shaft 37 is connected with a motor 38 which is disposed at the side of the mount base 31 by way of an eccentric pin 36, a link member 39 and an arm 41. Further, a gear 34a which is arranged at one end portion of the shaft 34 is meshed with a gear 37a which is arranged at one end portion of the shaft 37.

Due to such a constitution, when the motor 38 is rotated, the shaft 34 is rotated by way of the eccentric pin 36, the link member 39 and the arm 41 and, at the same time, the shaft 37 is rotated by way of the gears 34a, 37a. Then, along with such rotations, the mount base 31 and the push-up levers 35a, 35b which are supported on the shafts 34, 37 assume the inclined posture from the horizontal posture. Along with the inclination, the mount 8 or the dummy mount 9 which are supported on the mount base 31 and the push-up levers 35a, 35b from below are moved to the inside of the mount accommodating box 13 disposed above the mount base 31.

Here, as mentioned above, the mount holding members 16, 17 are pushed up from below by the mount 8 or the dummy mount 9 and assume the outer position (passing position) at which the mount holding members 16, 17 are brought into contact with the spring plates 18, 19. Accordingly, the mount 8 or the dummy mount 9 which is lifted from below by the mount base 31 and the push-up levers 35a, 35b is moved upwardly while passing the mount holding members 16, 17. Then, the mount holding members 16, 17 return to the inner position due to the resilient force of the spring plates 18, 19. Subsequently, the motor 38 is rotated in the reverse direction so as to return the mount base 31 and the push-up levers 35a, 35b to the horizontal position. Then, the mounts 8 and the dummy mounts 9 which are accommodated in the mount accommodating box 13 have the lower end thereof supported by the mount holding members 16, 17 which are returned to the inner position so that the mounts 8 and the dummy mounts 9 can be held in the inside of the mount accommodating box 13.

In this manner, by forming a gap of at least one sheet of mount between the lower end of the mounts held in the inside of the mount accommodating box 13 and the body part 11 by means of the mount holding member 16, 17, the feeding force of the discharge rollers 33a, 33b can be reduced. Accordingly, as a mechanism for rotatably driving the discharge rollers 33a, 33b, it is possible to use the simplified mechanism which is constituted of the pulse motor 27 commonly used for driving the discharge rollers 33a, 33b as well as the movable plate 25 and the members such as the pulleys 47 to 50. That is, the mount carrier unit 2 can be miniaturized by an amount corresponding to the simplification of the mechanism for rotatably driving the discharge rollers 33a, 33b.

Figure 18:
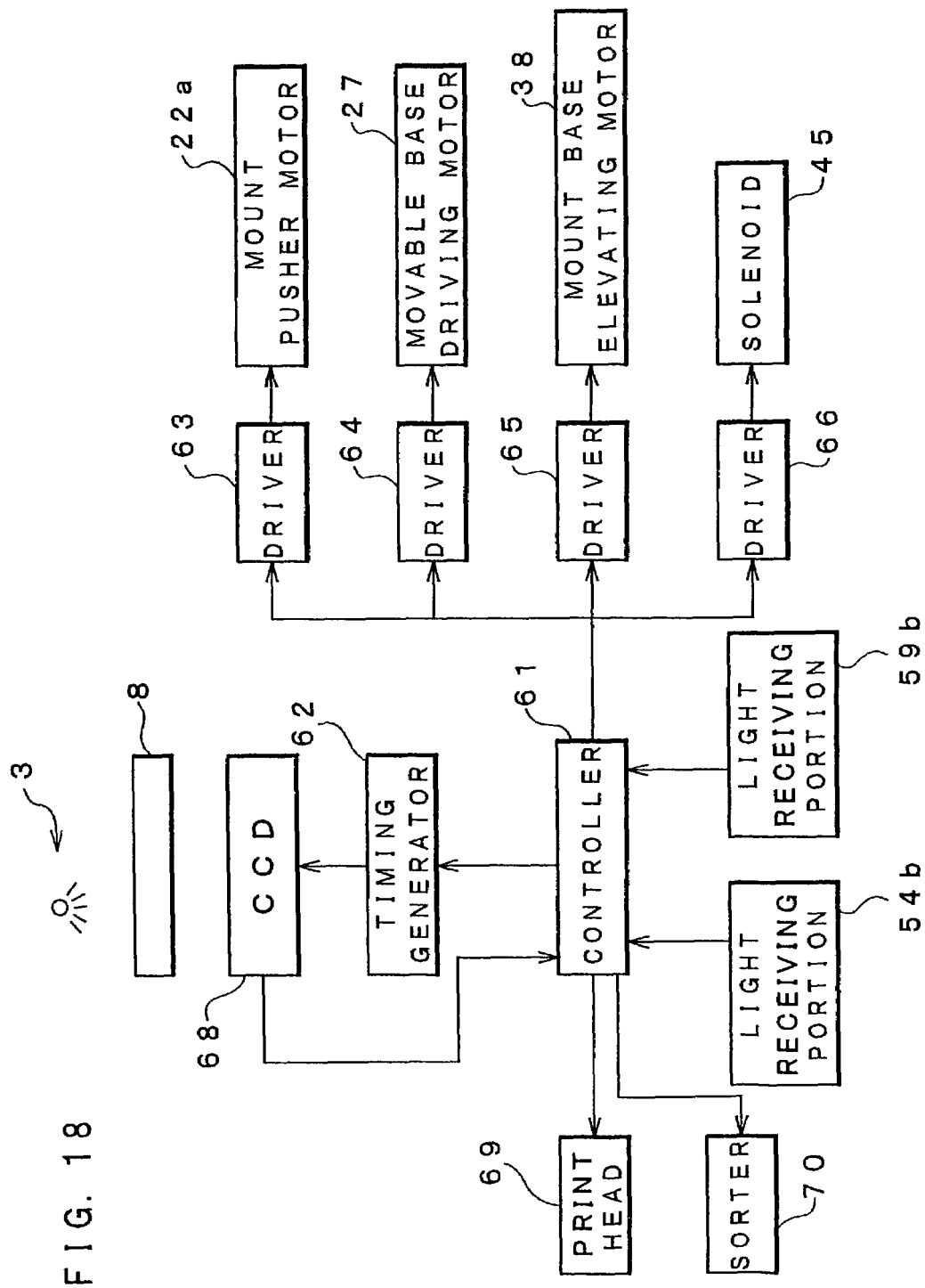
FIG. 18 is a block diagram showing the film scanner and a major part of a printer processor which is connected to the film scanner.

Subsequently, a control system of the film scanner 1 including the mount carrier unit 2 according to this embodiment is further explained in conjunction with FIG. 18. FIG. 18 is a block diagram of the film scanner 1 and a main part of a printer processor which is connected to the film scanner 1. In FIG. 18, the controller 61 (a determination means) which is included in the personal computer 5 is provided with a CPU which is controlled by proper software and hardware such as a ROM or a RAM. The controller 61 is connected with the light receiving portions 54b, 59b of the photo couplers 54, 59, the motor 22a, the pulse motor 27, drivers 63, 64, 65, 66 of the motors 38 and the solenoid 45, a timing generator 62 of the CCD line sensor 68, a print head 69 of the printer processor and the sorter 70 respectively.

Signals outputted from the light receiving portions 54b, 59b of the photo couplers 54, 59 are respectively supplied to the controller 61. In this embodiment, the light receiving portions 54b, 59b of the photo couplers 54, 59 continuously output the signals. The controller 61 supplies driving signals for the motor 22a, the pulse motor 27, the motor 38 and the solenoid 45 to the drivers 63, 64, 65, 66 respectively. Further, the controller 61 supplies a command to the timing generator 62 in synchronism with these driving signals and generates various types of timing signals supplied to the CCD line sensor 68. The light which is emitted from the light source part 3 and passes through the film held by the mount is incident on the CCD line sensor 68. Signals outputted from the CCD line sensor 68 are supplied to the controller 61 as image signals after being subjected to given processings. The image signals are supplied to the print head 69 at a given timing after being properly processed by the controller 61. Further, the controller 61 supplies a command for sorting the developed photographic printing papers every order to the sorter 70.

Subsequently, the overall operation of the film scanner 1 including the mount carrier unit 2 according to this embodiment is explained. When the operation of the film scanner 1 is started, first of all, the output signal from the light receiving portion 54b is supplied to the controller 61 and it is determined whether the mount 8 or the dummy mount 9 is on the insertion stocker mounting plate 21 or not. Here, as mentioned previously, the controller 61 performs the above-mentioned determination based on the change of the output signal pattern of the photo coupler 54 which follows the driving of the pusher pawls 23. Then, the controller 61 supplies the driving signals for the motor 22a to the driver 63 so that the mount 8 or the dummy mount 9 disposed at the lowermost position in the inside of the mount accommodating box 12 is pushed out onto the movable base 24 by the mount pusher pawl 23.

Then, when the output signal from the light receiving portion 59b is supplied to the controller 61, the controller 61 determines whether the object which is transported onto the movable base 24 by means of the pusher pawl 23 is the mount 8 or not, whether the object which is transported onto the movable base 24 by means of the pusher pawl 23 is the dummy mount 9 or not, or whether neither of these mounts is present on the movable base 24 or not based on the output signal from the light receiving portion 54b and on the output signal from the light receiving portion 59b. As the result of such a determination, when it is determined that neither the mount 8 or the dummy mount 9 is present on the movable base 24, the operation of the mount carrier unit 2 is stopped. Further, when either the mount 8 or the dummy mount 9 is present on the movable base 24, a driving signal is given to the driver 64 of the pulse motor 27 so that the movable base 24 is started to move to the left. When the movable base 24 reaches a position above the slit 30, the moving speed of the movable base 24 is changed to a speed (usually, lower than the speed in front or behind the slit 30) suitable for the scanning and the controller 61 gives a given command to the timing generator 62. Due to such a constitution, images recorded in the film held on the mount 8 can be picked up by scanning using the CCD line sensor 68.

Here, when it is detected that the object which is placed on the movable base 24 is the dummy mount 9 based on the output signals from the light receiving portions 54*b*, 59*b*, it is unnecessary to perform the scanning and hence, it is preferable to move the movable base 24 without changing the moving speed. Accordingly, it is possible to increase the processing ability of the mount carrier unit 2.

When the mount 8 or the dummy mount 9 passes over the scanning position and the movable base 24 reaches a position in the vicinity of the left end, a driving signal is supplied to the driver 65 of the motor 38 from the controller 61. Accordingly, the discharge rollers 33*a*, 33*b* are moved upwardly and are brought into contact with the lower surface of the mount 8 or the dummy mount 9. Since the discharge rollers 33*a*, 33*b* are rotated by the pulse motor 27 by way of the pulleys 47 to 50 and the ball screw 28, the mount 8 or the dummy mount 9 is fed onto the mount base 31 by means of the discharge rollers 33*a*, 33*b*.

Then, after the discharge rollers 33*a*, 33*b* are rotated by a given angle, a driving signal is supplied to the driver 66 of the solenoid 45 from the controller 61. Accordingly, the mount 8 or the dummy mount 9 is lifted and is accommodated into the inside of the mount accommodating box 13 after passing the mount holding members 16, 17. Here, the operational timing of the motor 38 and the solenoid 45 is determined based on the number of the pulses given to the pulse motor 27.

When it is determined that the mount which is mounted on the movable base 24 is the mount 8 based on the output signals from the light receiving portions 54*b*, 59*b*, image signals which are outputted from the CCD line sensor 68 and are processed by the controller 61 are supplied to the print head 69, and a photographic printing paper is exposed based on images recorded in the film of the mount 8. On the other hand, when it is detected based on the output signals from the light receiving portions 54*b*, 59*b* that the mount which is mounted on the movable base 24 is the dummy mount 9, image signals for preparing an index print of the mount 8 for one order before detecting the dummy mount 9 are supplied to the print head 69 from the controller 61. Then, a signal which makes the print for one order included in the index print arranged on a sorting plate different from a sorting plate for other print is supplied to the sorter 70 from the controller 61.

Subsequently, the detection of mount using two photo couplers 54, 59 in the film scanner 1 including the mount carrier unit 2 of this embodiment is explained in detail in conjunction with Table 1. In Table 1, the photo coupler 54 is expressed as S1 and the photo coupler 59 is expressed as S2, while an output signal of the photo coupler 54 immediately before the pusher pawl 23 is driven and is moved from the initial position is expressed as S1', and an output signal at a point of time that the pusher pawl 23 is driven and is moved to some extent from the initial position is expressed as S1". Further, in Table 1, "○" indicates the detection ON state and "×" indicates the detection OFF state.

First of all, a case in which the mount which is pushed toward the movable base 24 by means of the pusher pawl 23 is the mount 8 (usual mount) is considered. In this case, assuming that S1 and S2 have no failures and are operated normally (alternatively, both of S1 and dS2 have failures such that they always output ON), as shown in a column a, the output signals of S1', S1", and S2 become "○", "○", "○" in this order. Here, as in the case of this embodiment, in any one of cases consisting of a case in which the controller 61 performs the determination based on three output signals consisting of S1', S1" and S2, a case in which the controller 61 performs the determination based on only two output signals of consisting of S1' and S1", and a case in which the controller 61 performs the determination based on only two output signals consisting of S1' and S2, the controller 61 determines that the mount which is pushed toward the movable base 24 by the pusher pawl 23 is the mount 8.

On the other hand, when S1 and/or S2 have a failure, (to be more accurate, excluding a case in which neither S1 nor S2 has a failure and is operated normally and a case in which S1 and S2 have failures such that S1 and S2 always output ON), as shown in columns b to d, the output signals of the S1', S1" and S2 become "○", "○", "×" or "×", "×", "○" or "×", "×", in this order. In this manner, when S1 and/or S2 have a failure, by allowing the controller 61 to perform the determination of this embodiment based on three output signals consisting of S1', S1" and S2, the cases shown in the column b and the column c can be detected as errors (however, the detection is impossible with respect to the case shown in the column d and hence, the detection is made such that there exists no mount).

However, when the controller 61 performs a determination based on only two output signals consisting of S1' and S1", it is determined that the mount which is pushed toward the movable base 24 by the pusher pawl 23 is the mount 8 as shown in the column b or it is determined that no mount is pushed toward the movable base 24 by the pusher pawl 23 as shown in the column c. Further, when the controller 61 performs the determination based on only two output signals consisting of S1' and S2, it is determined that the mount which is pushed toward the movable base 24 by the pusher pawl 23 is the dummy mount 9 as shown in the column c. Accordingly, with the use of the mount carrier unit 2 of this embodiment, it is possible to detect the failures of the photo couplers 54, 59 as errors with high probability.

Subsequently, a case in which the mount which is pushed toward the movable base 24 by means of the pusher pawl 23 is the dummy mount 9 is considered. In this case, assuming that S1 and S2 have no failures and are operated normally (alternatively, S1 is normal and S2 has a failure such that S2 always outputs ON), as shown in a column i, the output signals of S1', S1" and S2 become "×", "○", "○" in this order. Here, as in the case of this embodiment, in anyone of cases consisting of a case in which the controller 61 performs the determination based on three output signals consisting of S1', S1" and S2, a case in which the controller 61 performs the determination based on only two output signals of consisting of S1' and S1", and a case in which the controller 61 performs the determination based on only two output signals consisting of S1' and S2, the controller 61 determines that the mount which is pushed toward the movable base 24 by the pusher pawl 23 is the dummy mount 9. Further, in this case, since the output signal of the photo coupler 54 is changed over from OFF to ON in the course of the processing, it is confirmed that the photo coupler 54 is operated normally.

On the other hand, when S1 and/or S2 have a failure, (to be more accurate, excluding a case in which neither S1 nor S2 has a failure and is operated normally and a case in which S1 is operated normally and S2 has a failure such that S2 always outputs ON), as shown in columns e to h and a column j, the output signals of the S1', S1"and S2 become "○", "○", "○" or "○", "○", "×" or "×", "×", "○" or "×", "×", "×" or "×", "○", "×" in this order. In this manner, when S1 and/or S2 have a failure, by allowing the controller 61 to perform the determination based on three output signals consisting of S1', S1" and S2 as in the case of this embodiment, the cases shown in the column f to g are detected as errors and the case shown in the column j is detected as a case which detects the dummy mount 9 accurately (however, the detection is impossible with respect to the cases shown in the column e and the column h and hence, the detection is made such that the mount which is pushed toward the movable base 24 by the pusher pawl 23 is the mount 8 or the detection is made such that there exists no mount). Further, with respect to the case shown in the column j, since the output signal of the photo coupler 54 is changed over from OFF to ON in the course of the processing, it is confirmed that the photo coupler 54 is operated normally and it is also confirmed that the photo coupler 59 has a failure.

However, when the controller 61 performs the determination based on only two output signals consisting of S1' and S1", it is determined that the mount which is pushed toward the movable base 24 by the pusher pawl 23 is the mount 8 as shown in the column f or it is determined that no mount is pushed toward the movable base 24 by the pusher pawl 23 as shown in the column g. Further, when the controller 61 performs the determination based on only two output signals consisting of S1' and S2, it is determined that the mount which is pushed toward the movable base 24 by the pusher pawl 23 is the dummy mount 9 as shown in the column g which is to be determined as an error or it is determined that there exists no mount which is pushed toward the movable base 24 by the pusher pawl 23 as shown in the column j which can detect the dummy mount 9 using only S1. Accordingly, with the use of the mount carrier unit 2 of this embodiment, it is possible to detect the failures of the photo couplers 54, 59 as errors with high probability and, at the same time, the dummy mount 9 can be accurately detected.

Subsequently, a case in which neither the mount 8 nor the dummy 9 is pushed toward the movable base 24 by means of the pusher pawl 23 is considered. In this case, assuming that S1 and S2 have no failures and are operated normally (alternatively, both of S1 and S2 have failures such that they always output OFF), as shown in a column n, the output signals of S1', S1" and S2 become "×", "×", "×" in this order. Here, as in the case of this embodiment, in any one of cases consisting of a case in which the controller 61 performs the determination based on three output signals consisting of S1', S1" and S2, a case in which the controller 61 performs the determination based on only two output signals of consisting of S1' and S1", and a case in which the controller 61 performs the determination based on only two output signals consisting of S1' and S2, the controller 61 determines that there exists no mount which is pushed toward the movable base 24 by the pusher pawl 23.

On the other hand, when S1 and/or S2 have a failure, (to be more accurate, excluding a case in which neither S1 nor S2 has a failure and they are operated normally and a case in which S1 and S2 have failures such that S1 and S2 always output OFF), as shown in columns k to m, the output signals of the S1', S1" and S2 become "○", "○", "○" or "○", "○", "×" or "×", "×", "○" in this order. In this manner, when S1 and/or S2 have a failure, by allowing the controller 61 to perform the determination based on three output signals consisting of S1', S1" and S2 as in the case of this embodiment, the cases shown in the column l and the column m are detected as errors (however, the detection is impossible with respect to the case shown in the column k and hence, the detection is made such that usual mount 8 is pushed toward the movable base 24 by the pusher pawl 23).

However, when the controller 61 performs a determination based on only two output signals consisting of S1' and S1", it is determined that the mount which is pushed toward the movable base 24 by the pusher pawl 23 is the mount 8 as shown in the column l or it is determined that no mount is pushed toward the movable base 24 by the pusher pawl 23 as shown in the column m. Further, when the controller 61 performs the determination based on only two output signals consisting of S1', and S2, it is determined that the mount which is pushed toward the movable base 24 by the pusher pawl 23 is the dummy mount 9 as shown in the column m. Accordingly, with the use of the mount carrier unit 2 of this embodiment, it is possible to detect the failures of the photo couplers 54, 59 as errors with high probability.

Here, with respect to the erroneous determination of the column e and the column k of Table 1, it is possible to detect them in the initial operation or the automatic focusing operation, while with respect to the erroneous determination of the column d and the column h, the film scanner 1 becomes inoperable so that the operator can restore with naked eyes whereby no serious problem arises.

As mentioned previously, according to the mount carrier unit 2 of this embodiment, the detection of mount is performed by taking the change pattern of the output signals of the photo coupler 54 into consideration while using two photo couplers 54, 59 and hence, it is possible to distinguish whether the mount which is pushed toward the movable base 24 by the pusher pawl 23 is the mount 8 or the dummy mount 9 with high accuracy. Accordingly, problems such as a problem that the mount 8 which is to be scanned is not scanned, a problem that the dummy mount 9 which is not to be scanned is scanned as an opposite case, a problem that the order change processing is performed where the order change processing should not be performed or a problem that the order change processing is not performed where the order change processing should be performed are hardly generated. Further, as can be clearly understood from the above-mentioned Table 1, the failure of the photo couplers 54, 59 can be found with high accuracy.

Further, according to this embodiment, it is possible to distinguish between the case in which neither the mount 8 nor the dummy mount 9 is pushed toward the movable base 24 by the push pawl 23 and the case in which either one of the mount 8 and the dummy mount 9 is pushed toward the movable base 24 by the pusher pawl 23 with high accuracy. Accordingly, when the processing of the mounts 8 and the dummy mounts 9 in the inside of mount accommodating box 12 is completed, there arises no problem even when the film scanner 1 is automatically stopped. Further, there is substantially no fear that the driving of the film scanner 1 is automatically stopped in spite of the fact that the mounts 8 or the dummy mounts 9 remain in the inside of the mount accommodating box 12.

Further, although two photo couplers 54, 59 are used as sensors in the above-mentioned first embodiment, it is possible to partially obtain the above-mentioned advantageous effect by providing only the photo coupler 54 and by detecting the output signal pattern of the photo coupler 54 in the course of transporting one mount 8 using the pusher pawl 23. This feature becomes apparent by comparing the case in which the controller 61 performs the determination based on only two output signals consisting of S1' and S1" in the column j of the above-mentioned Table 1 (corresponding to the case in which only the photo coupler 54 is provided) and the case in which the controller 61 performs the determination based on only two output signals consisting of S1' and S2. Further, in this case, it is possible to distinguish between the dummy mount 9 and the mount 8 using only one photo coupler with high probability so that the constitution of the device can be simplified.

Further, although the determination is performed based on the shapes of the mount 8 and the dummy mount 9 in the above-mentioned embodiment, even when the mount 8 and the dummy mount 9 have the same shape, it may be possible to distinguish both mounts by attaching any kind of marks such as bar codes which can make both mounts different from each other and by using a sensor which can respond to such marks.

Further, it is possible to use the mount carrier unit 2 according to the first embodiment in a form that the mount carrier unit 2 is mounted on various types of equipment other than the film scanner.

Figure 19:
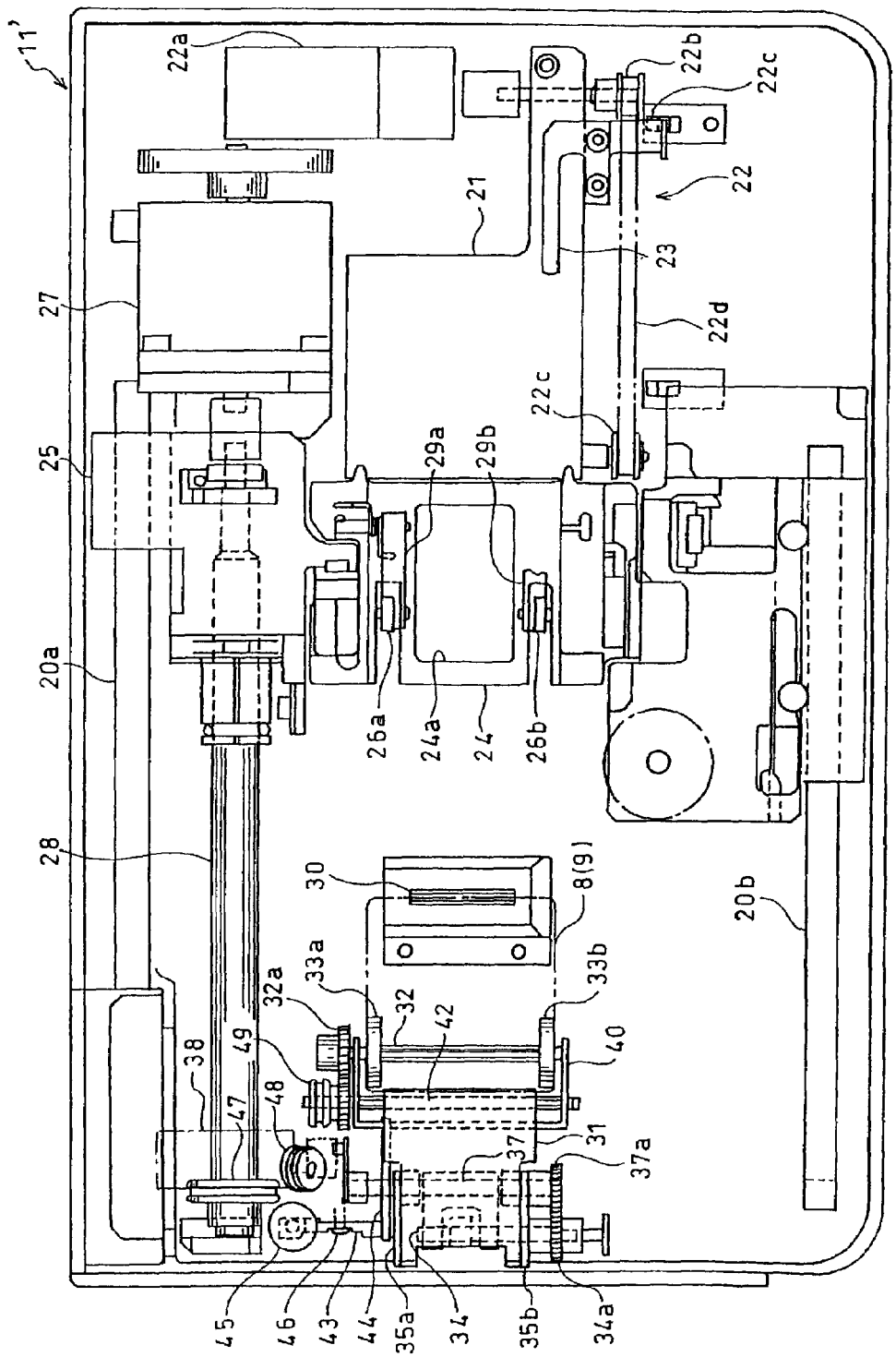
FIG. 19 is a plan view of a body part of a mount carrier unit used in a film scanner according to a second embodiment of the present invention.

Subsequently, a film scanner according to the second embodiment of the present invention is explained further in conjunction with FIG. 19 to FIG. 21. FIG. 19 is a plan view of a body part of a mount carrier unit which is used for the film scanner according to this embodiment.

The body part 11' of the mount carrier unit depicted in FIG. 19 is constituted in the same manner as the body part 11 of the mount carrier unit 2 according to the first embodiment except for a point that the body part 11' is not provided with the levers 53, 58 which are rotated about the shafts 52, 57 and the photo couplers 54, 59. Here, in this embodiment, parts identical with the parts shown in FIG. 6 are indicated by the same symbols and their explanation is omitted. Further, since mount accommodating boxes mounted on the body part 11' are similar to the mount accommodating boxes 12, 13 which are explained in conjunction with the first embodiment so that their explanation is omitted here.

Figure 20:
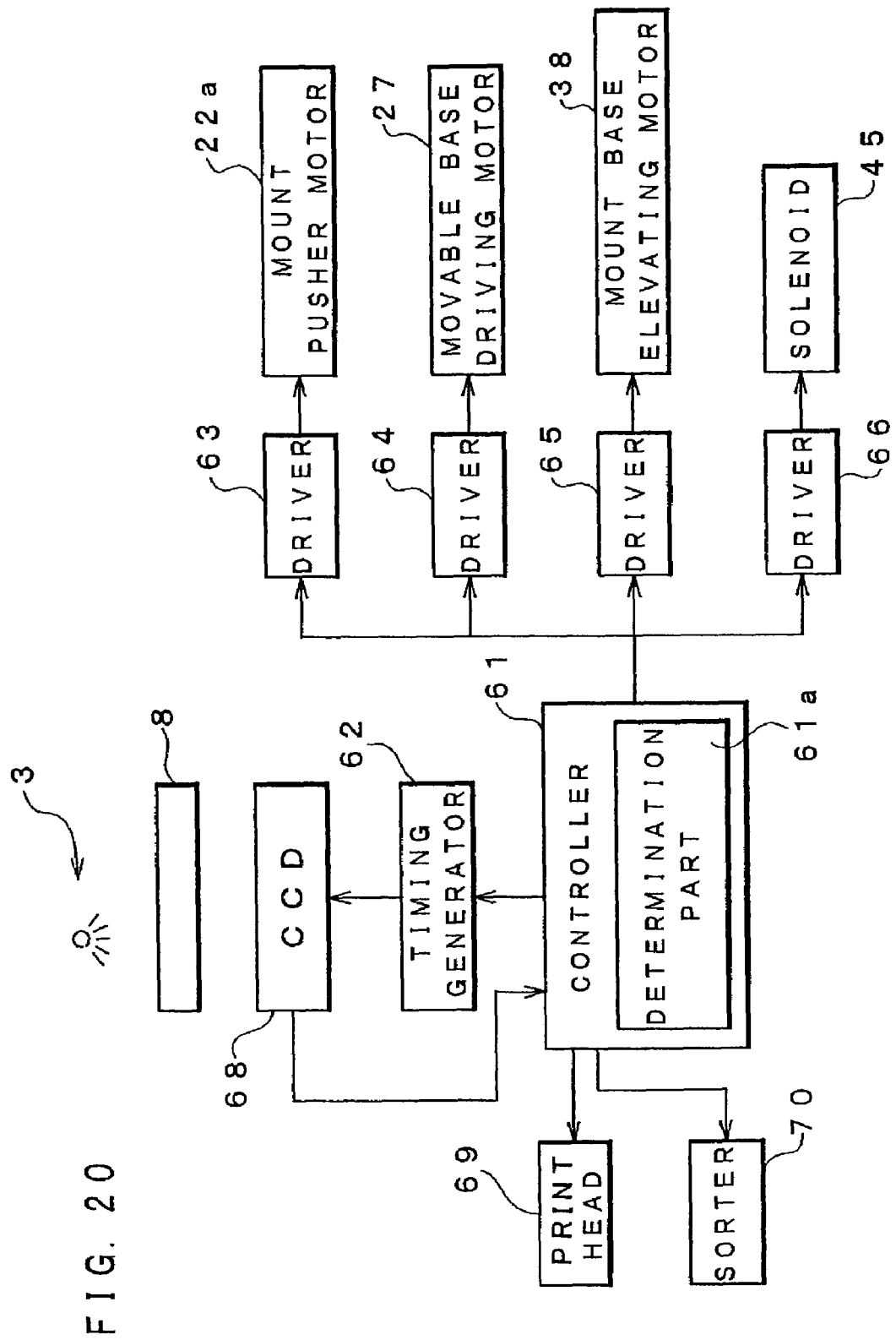
FIG. 20 is a block diagram with respect to the film scanner of the second embodiment of the present invention and a major part of a printer processor which is connected to the film scanner.

FIG. 20 is a block diagram showing the film scanner of this embodiment and a main part of the printer processor which is connected to the film scanner. As can be clearly understood from FIG. 20, the film scanner of this embodiment differs from the film scanner explained in conjunction with FIG. 18 only with respect to a point that a determination part 61a is constructed in the inside of a controller 61 and light receiving portions of photo couplers are not connected to the controller 61. The determination part 61a has a function of analyzing image signals supplied from a CCD line sensor 68 and determining whether the image signals are signals related with the mount 8 holding a film or signals related with a dummy mount based on the change of the image signals. To be more in detail, the determination part 61a compares a light and dark level of the image signals with a given threshold value and distinguishes the mount 8 and the dummy mount using the result of the comparison.

Figure 21:
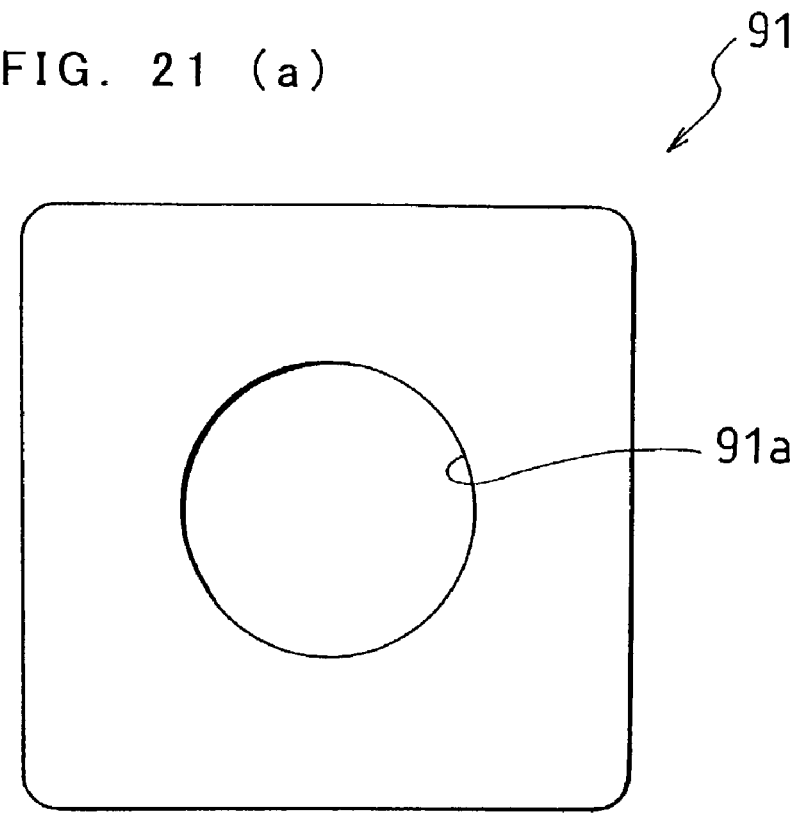
FIG. 21 is a plan view for showing an example of a dummy mount used in the second embodiment of the present invention.
Figure 21:
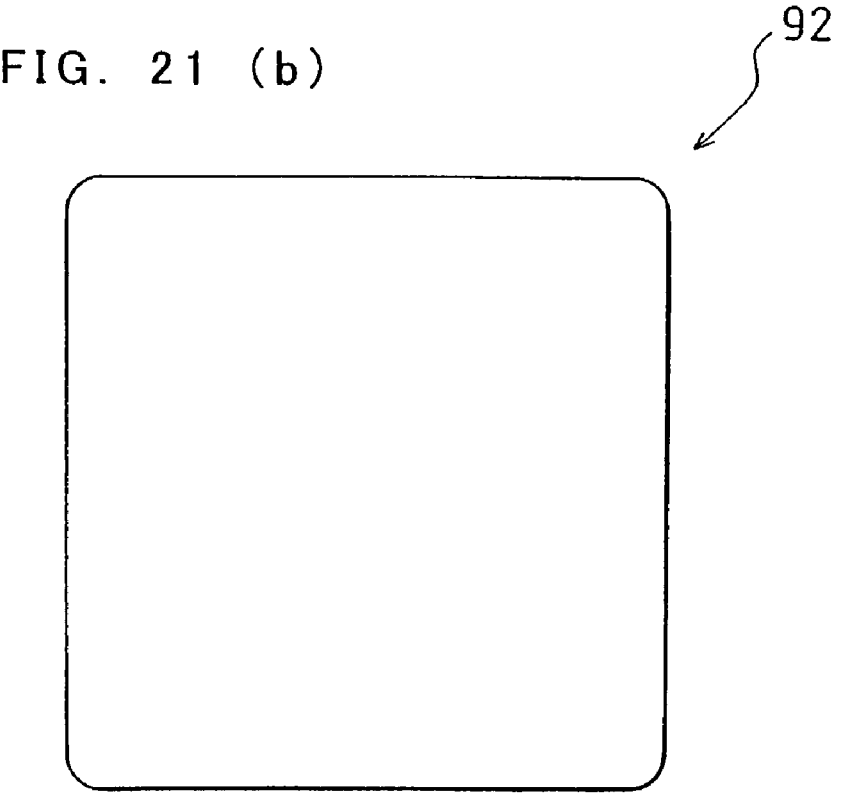

FIG. 21 shows examples of dummy mount used in this embodiment. The dummy mount 91 shown in FIG. 21A has a profile of an approximately square shape and has an opening 91a at a center portion thereof. The shape of the opening 91a may be equal to or different from the shape of an opening which is served for holding a film of the mount 8. Here, the determination part 61a determines that the scanning object is the dummy mount 91 when the determination part 61a detects that the light and dark level of the image signals obtained from the CCD line sensor 68 is changed from a level below a given threshold value (being set at a value between a level at which light reaches the CCD line sensor 68 without being interrupted by any object and a level at which light reaches the CCD line sensor 68 after passing the film) to a value above the threshold value level and thereafter is changed to a value below the threshold value in response to the change of the image signals. On the other hand, the determination part 61a determines that the scanning object is the mount 8 when the determination part 61a detects that the image signal obtained from the CCD line sensor 68 always holds a value below a given threshold value based on the change of the image signals.

Further, the dummy mount 92 shown in FIG. 21B, is formed of a simple plate-like member having an approximately square profile. Here, the determination part 61a determines the scanning object as the dummy mount 92 when the light and dark level of image signals obtained from the CCD line sensor 68 is always below a given threshold value (the level being set to a value between a level at which light does not reach the CCD line sensor 68 and a level at which the light passes the film and reaches the CCD line sensor 68) based on the change of the image signals. On the other hand, the determination part 61a determines the scanning object as the mount 8 when the determination part 61a detects that the image signals obtained from the CCD line sensor 68 is changed from a value below a given threshold value to a value above the given threshold value and is thereafter changed to the value below the threshold value based on the change of the image signals. Here, so long as the dummy mount is different from the mount 8 in feature in appearance, dummy mounts other than those illustrated in FIG. 21A and FIG. 21B can be used.

Then, the general manner of operation of the film scanner according to this embodiment is explained. When the operation of the mount carrier unit 2 is started, a driving signal for the motor 22a is supplied to the driver 63 from the controller 61 so that the mount 8 or the dummy mount 91, 92 which are disposed at the lowermost position in the inside of the mount accommodating box 12 is pushed onto the a movable base 24 by means of the mount pusher pawl 23.

Thereafter, a driving signal is given to the driver 64 of the pulse motor 27 so that the movable base 24 is started to move toward the right. When the movable base 24 reaches a position above the slit 30, the moving speed of the movable base 24 is changed to a speed suitable for scanning (usually, lower than the speed before and after the slit 30) and a given command is supplied to the timing generator 62 from the controller 61.

When the mount 8 or the dummy mount 91, 92 passes over the scanning position and the movable base 24 reaches a position in the vicinity of the left end, a driving signal is supplied to the driver 65 of the motor 38 from the controller 61. Accordingly, the discharge rollers 33a, 33b are moved upwardly and are brought into contact with the lower surface of the mount 8 or the dummy mount 91, 92. Since the discharge rollers 33a, 33b are rotated by the pulse motor 27 by way of the pulleys 47 to 50 and the ball screw 28, the mount 8 or the dummy mount 9 is fed onto the mount base 31 by means of the discharge rollers 33a, 33b.

Then, after the discharge rollers 33a, 33b are rotated by a given angle, a driving signal is supplied to the driver 66 of the solenoid 45 from the controller 61. Accordingly, the mount 8 or the dummy mount 91, 92 is lifted and is accommodated into the inside of the mount accommodating box 13 after passing the mount holding members 16, 17. Here, the operational timing of the motor 38 and the solenoid 45 is determined based on the number of the pulses given to the pulse motor 27.

When the determination part 61a determines that the scanning object which is mounted on the movable base 24 is the mount 8 based on the change of the image signals obtained by the CCD line sensor 68, the image signals outputted from the CCD line sensor 68 and are processed by the controller 61 are supplied to the print head 69, and a photographic printing paper is exposed based on images recorded in the film of the mount 8. On the other hand, when the determination part 61a determines that the mount which is mounted on the movable base 24 is the dummy mount 91 or 92, image signals for preparing an index print of the mount 8 for one order before scanning the dummy mount 91 or 92 are supplied to the print head 69 from the controller 61. Then, a signal which makes the print for one order including the index print arranged on a sorting plate different from a sorting plate for other print is supplied to the sorter 70 from the controller 61. Here, the operation of the mount carrier unit is stopped when the determination part 61a determines that the scanning object mounted on the movable base 24 is neither the mount 8 nor the dummy mount 91 or 92 based on the change of image signals obtained from CCD line sensor 68.

In this manner, according to the film scanner of this embodiment, the dummy mount 91 or 92 is distinguished from the mount 8 based on the change of the image signals obtained by the CCD line sensor 68. Even when the mounts 8 corresponding to a plurality of orders are accommodated in the inside of the mount accommodating box 12 in a stacked manner and these mounts 8 are continuously scanned, by arranging the dummy mounts 91 or 92 such that they are inserted in the boundaries of the orders, it is possible to prepare the index prints and sort the prints for each order. Further, the number of mounts 8 which is equal to or close to the allowable accommodation number of mounts 8 which can be accommodated in the inside of the mount accommodating box 12 can be accommodated in the inside of the mount accommodating box 12 and hence, the number of operations for accommodating the mounts into the inside of the mount accommodating box 12 can be reduced whereby the cumbersomeness which follows these operation can be reduced and the time required up to the completion of the scanning can be largely reduced. Accordingly, when an automatic processing is performed, it is unnecessary for operator to perform the operation while standing beside the scanner 1.

Further, according to this embodiment, it is possible to distinguish the mount and the dummy mount based on the change of image signals and hence, an advantageous effect substantially similar to the advantageous effect that the mount and the dummy mount can be distinguished based on two output signals consisting of S1' and S1" in the above-mentioned Table 1 can be obtained. That is, the mount and the dummy mount can be distinguished with high probability and, at the same time, it is possible to confirm that CCD line sensor 68 or the like has no failure.

Further, according to this embodiment, different from the first embodiment, the photo couplers 54, 59 and the levers 53, 58 are unnecessary and hence, an advantageous effect that the structure can be simplified is obtained.

Here, this embodiment may adopt a photo coupler 59 similar to the photo coupler 59 used in the first embodiment as the second sensor. Due to such a constitution, it is possible to find out the failure of the device with high accuracy in the same manner as the first embodiment.

Although the preferred embodiments of the present invention have been explained heretofore, the present invention is not limited to the above-mentioned embodiments and various design changes can be made within the description of the scope of claims. For example, in the first embodiment, both of the photo couplers 54, 59 and levers 53, 58 may be mounted at a position close to the insertion stocker mounting plate 21. Further, the light receiving portion 59b may be shielded from light even when neither the mount 8 nor the dummy mount 9 is mounted on the movable base 24. The same goes for the light receiving portion 54b.

Further, the photo couplers 54, 59 and the levers 53, 58 may be arranged at a position closer to the mount accommodating box 13 than the scanning position. In this case, however, since the fact that the mount is the dummy mount is determined after the completion of scanning so that the transporting speed of the dummy mount cannot be made greater than the transporting speed of the mount. Further, as means which distinguishes between the mount and the dummy mount, besides means which is provided with the photo coupler and the lever, other known means can be also used. Further, in the above-mentioned embodiment, although the mount accommodating box 13 is inclined with respect to the body part 11, the mount accommodating box 13 may be projected vertically with respect to the body part 11.

Further, the mechanism which elevates the discharge rollers 33a, 33b is not limited to the above-mentioned solenoid 45, the link members 43, 44 and arm 40 and various other mechanisms can be used as such elevating mechanism. Further, as the mechanism for supplying the mount 8 onto the mount base 31, a mechanism other than the mechanism which uses the discharge rollers 33a, 33b can be used.

Further, it is not always necessary that the mount holding members 16, 17 which are served for holding the mount 8 in the inside of the mount accommodating box 13 are rotatably supported on the side walls 13a, 13b of the above-mentioned mount accommodating box 13 and the mount holding members 16, 17 may be constituted such that they perform the above-mentioned function by ensuring the slide contact with the side walls 13a, 13b, for example.

Further, the mechanism for elevating the mount base 31 is not limited to the above-mentioned mechanism which uses the motor 38, the link member 39 and the arm 41 and various other mechanism can be adopted as such an elevating mechanism.

TABLE 1

| supplied mount | | S1' | S1" | S2 | determine with S1' + S1" | determine with S1' + S1" + S2 | determine with S1' + S2 | remarks |
|---|---|---|---|---|---|---|---|---|
| usual mount | a | ○ | ○ | ○ | usual | usual | usual | normal operation |
|  | b | ○ | ○ | X | usual | error | error |  |
|  | c | X | X | ○ | no mount | error | dummy |  |
|  | d | X | X | X | no mount | no mount | no mount |  |
| dummy mount | e | ○ | ○ | ○ | usual | usual | usual |  |
|  | f | ○ | ○ | X | usual | error | error |  |
|  | g | X | X | ○ | no mount | error | dummy |  |
|  | h | X | X | X | no mount | no mount | no mount |  |
|  | i | X | ○ | ○ | dummy | dummy | dummy | confirm S1 being normal, normal operation |
|  | j | X | ○ | X | dummy | dummy | no mount | confirm S1 being normal, confirm failure of S2 |
| no mount | k | ○ | ○ | ○ | usual | usual | usual |  |
|  | l | ○ | ○ | X | usual | error | error |  |
|  | m | X | X | ○ | no mount | error | dummy |  |
|  | n | X | X | X | no mount | no mount | no mount | normal operation |

What is claimed is:

1. A mount carrier unit comprising:
a transport means which sequentially transports mounts which hold films or dummy mounts which have a feature different from a feature of the mounts one after another in the order in accordance with the relative position between the mounts and the dummy mounts in the inside of a mount accommodating box in which the mounts and the dummy mounts are accommodated in a stacked manner, and
a first sensor which is capable of outputting detection results having patterns different from each other corresponding to a case in which the mount is transported by the transport means and a case in which the dummy mount is transported by the transport means based on the features of the mount and the dummy mount along with the driving of the transport means.

2. A mount carrier unit according to claim 1, wherein the mount carrier unit is further comprising a second sensor which is capable of detecting that either one of the mount and the dummy mount is disposed at a given position.

3. A mount carrier unit according to claim 1, wherein the first sensor is capable of outputting detection results of patterns different from each other corresponding to a case in which the mount is transported by the transport means and a case in which the dummy mount is transported by the transport means based on shapes of the mount and the dummy mount along with the driving of the transport means.

4. A mount carrier unit according to claim 1, wherein the first sensor is capable of outputting detection results of patterns different from each other corresponding to a case in which the mount is transported by the transport means, a case in which the dummy mount is transported by the transport means and a case neither the mount nor the dummy mount is transported based on features of the mount and the dummy mount along with the driving of the transport means.

5. A film scanner comprising:
a scanning means for scanning images recorded in films held by mounts,
a transport means which sequentially transports mounts or dummy mounts which have a feature in appearance different from a feature in appearance of the mounts one after another in the order in accordance with the relative position between the mounts and the dummy mounts in the inside of a mount accommodating box in which the mounts and the dummy mounts are accommodated in a stacked manner for making the mounts and the dummy mounts subjected to scanning by the scanning means, and
a determination means for determining whether the mount or the dummy mount is transported by the transport means based on the change of image signals obtained by the scanning means following the driving of the transport means.

6. A film scanner according to claim 5, wherein the determination means determines whether the mount or the dummy mount is transported by the transport means or whether neither the mount nor the dummy mount is transported by the transport means based on the change of image signals obtained by the scanning means following the driving of the transport means.

7. A mount carrier unit comprising:
a driving mechanism which sequentially transports mounts which hold films or dummy mounts which have a feature different from a feature of the mounts one after another in the order in accordance with the relative position between the mounts and the dummy mounts in the inside of a mount accommodating box in which the mounts and the dummy mounts are accommodated in a stacked manner, and
a first sensor which is capable of outputting detection results having patterns different from each other corresponding to a case in which the mount is transported by the driving mechanism and a case in which the dummy mount is transported by the driving mechanism based on the features of the mount and the dummy mount along with the driving of the driving mechanism.

8. A mount carrier unit according to claim 7, wherein the mount carrier unit is further comprising a second sensor which is capable of detecting that either one of the mount and the dummy mount is disposed at a given position.

9. A mount carrier unit according to claim 7, wherein the first sensor is capable of outputting detection results of patterns different from each other corresponding to a case in which the mount is transported by the driving mechanism and a case in which the dummy mount is transported by the driving mechanism based on shapes of the mount and the dummy mount along with the driving of the driving mechanism.

10. A mount carrier unit according to claim 7, wherein the first sensor is capable of outputting detection results of patterns different from each other corresponding to a case in which the mount is transported by the driving mechanism, a case in which the dummy mount is transported by the driving mechanism and a case neither the mount nor the dummy mount is transported based on features of the mount and the dummy mount along with the driving of the driving mechanism.

11. A film scanner comprising:
a scanning mechanism for scanning images recorded in films held by mounts,
a driving mechanism which sequentially transports mounts or dummy mounts which have a feature in appearance different from a feature in appearance of the mounts one after another in the order in accordance with the relative position between the mounts and the dummy mounts in the inside of a mount accommodating box in which the mounts and the dummy mounts are accommodated in a stacked manner for making the mounts and the dummy mounts subjected to scanning by the scanning mechanism, and
a controller for determining whether the mount or the dummy mount is transported by the driving mechanism based on the change of image signals obtained by the scanning mechanism following the driving of the driving mechanism.

12. A film scanner according to claim 11, wherein the controller determines whether the mount or the dummy mount is transported by the driving mechanism or whether neither the mount nor the dummy mount is transported by the driving mechanism based on the change of image signals obtained by the scanning mechanism following the driving of the driving mechanism.

* * * * *